United States Patent
Ha et al.

(10) Patent No.: US 8,495,493 B2
(45) Date of Patent: Jul. 23, 2013

(54) IMAGE FORMING APPARATUS AND ENLARGEMENT DISPLAY METHOD OF TARGET AREA THEREOF

(75) Inventors: Kwang-soo Ha, Seoul (KR); Sung-jae Chung, Seoul (KR); Bong-gun Kim, Yongin-si (KR); Sang-su Lee, Seoul (KR); Sung-man Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 12/871,179

(22) Filed: Aug. 30, 2010

(65) Prior Publication Data

US 2011/0107209 A1 May 5, 2011

(30) Foreign Application Priority Data

Oct. 30, 2009 (KR) .......................... 10-2009-0104589

(51) Int. Cl.
*G06F 3/01* (2006.01)
(52) U.S. Cl.
USPC .......................................... 715/702; 715/821
(58) Field of Classification Search
USPC .......................................... 715/702, 711, 810
See application file for complete search history.

(56) References Cited

U.S. PATENT DOCUMENTS

| | | | | |
|---|---|---|---|---|
| 7,434,177 | B1 * | 10/2008 | Ording et al. | 715/862 |
| 7,518,611 | B2 * | 4/2009 | Boyd et al. | 345/473 |
| 7,737,958 | B2 * | 6/2010 | Jeon et al. | 345/173 |
| 7,884,809 | B2 * | 2/2011 | Fabre et al. | 345/173 |
| 8,276,098 | B2 * | 9/2012 | Fagans et al. | 715/811 |
| 2003/0013493 | A1 * | 1/2003 | Irimajiri et al. | 455/566 |
| 2004/0051741 | A1 * | 3/2004 | Venturino | 345/812 |
| 2006/0123360 | A1 * | 6/2006 | Anwar et al. | 715/810 |
| 2007/0277125 | A1 * | 11/2007 | Shin et al. | 715/863 |
| 2008/0177900 | A1 * | 7/2008 | Grant et al. | 710/1 |

FOREIGN PATENT DOCUMENTS

KR 20060022114 9/2006

* cited by examiner

*Primary Examiner* — Omar Abdul-Ali
(74) *Attorney, Agent, or Firm* — Stanzione & Kim, LLP

(57) ABSTRACT

An enlargement display method of a target area of an image forming apparatus which comprises a touch screen includes selecting a target zooming function to zoom at least one menu displayed on the touch screen as a target screen to perform at least one of functions of the image forming apparatus, enlarging and displaying at least one menu corresponding to the target area according to the selection, selecting at least one of navigation buttons to move the target area, and moving and displaying the enlarged target area through the selected navigation button. With this, the image forming apparatus and the enlargement display method enlarge and display the necessary menu as the target area and the target area is moved through the navigation button to thereby improve a user's convenience.

24 Claims, 36 Drawing Sheets

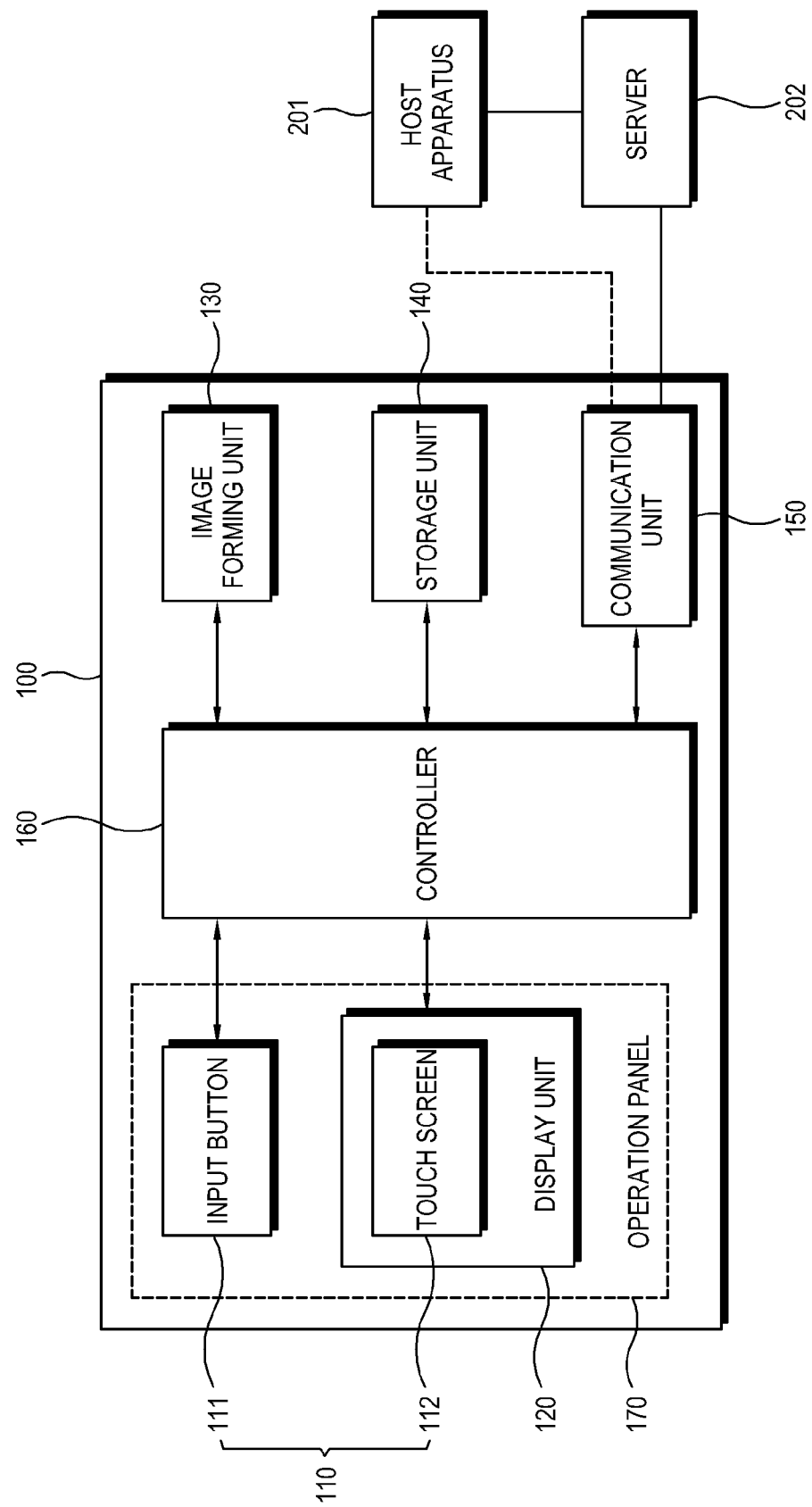

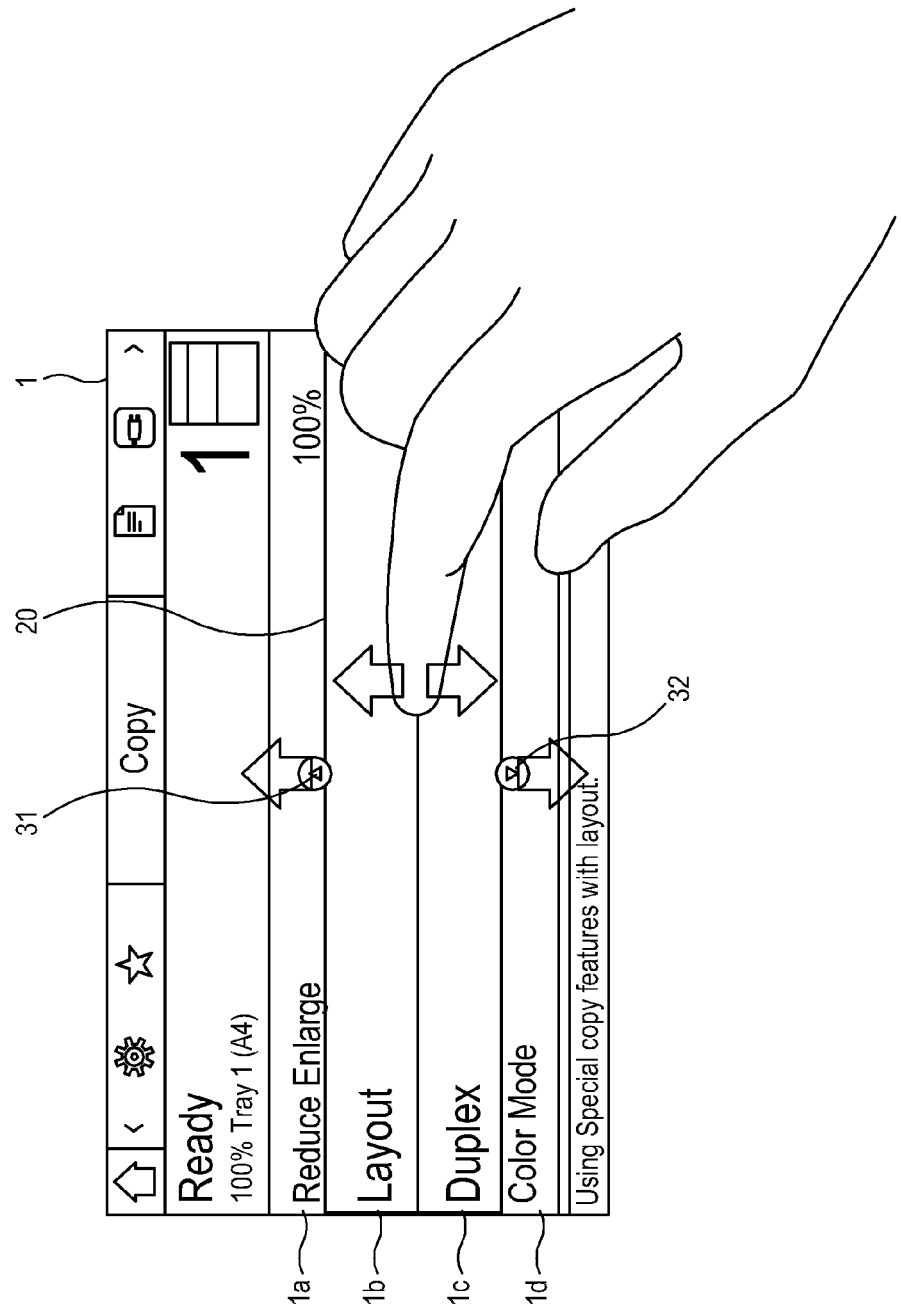

FIG. 5B

| Reduce Enlarge | |
|---|---|
| Layout | Normal |
| Duplex | 2-2side |
| Darkness | Normal |
| Orignal Type | Text/Photo |
| Margin Shift | Off |
| Adjust Background | Off |
| Edge Erase | Off |
| Gray Enhance | On ▷ |

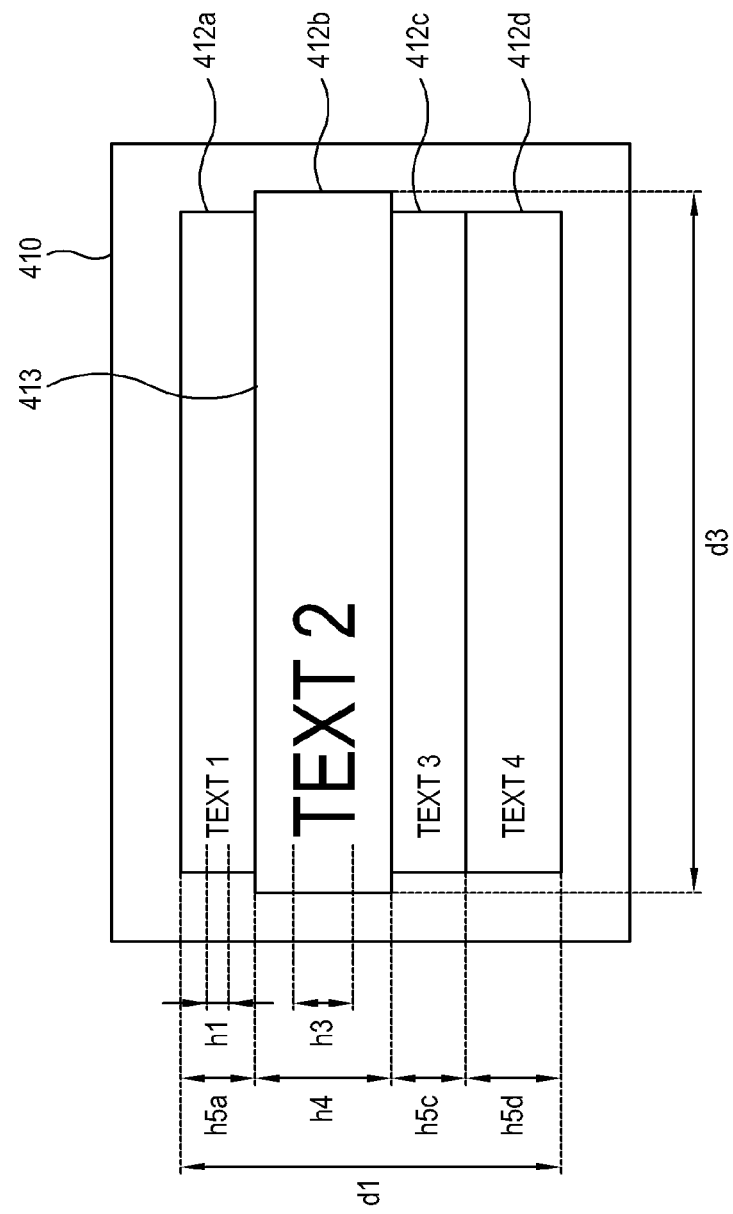

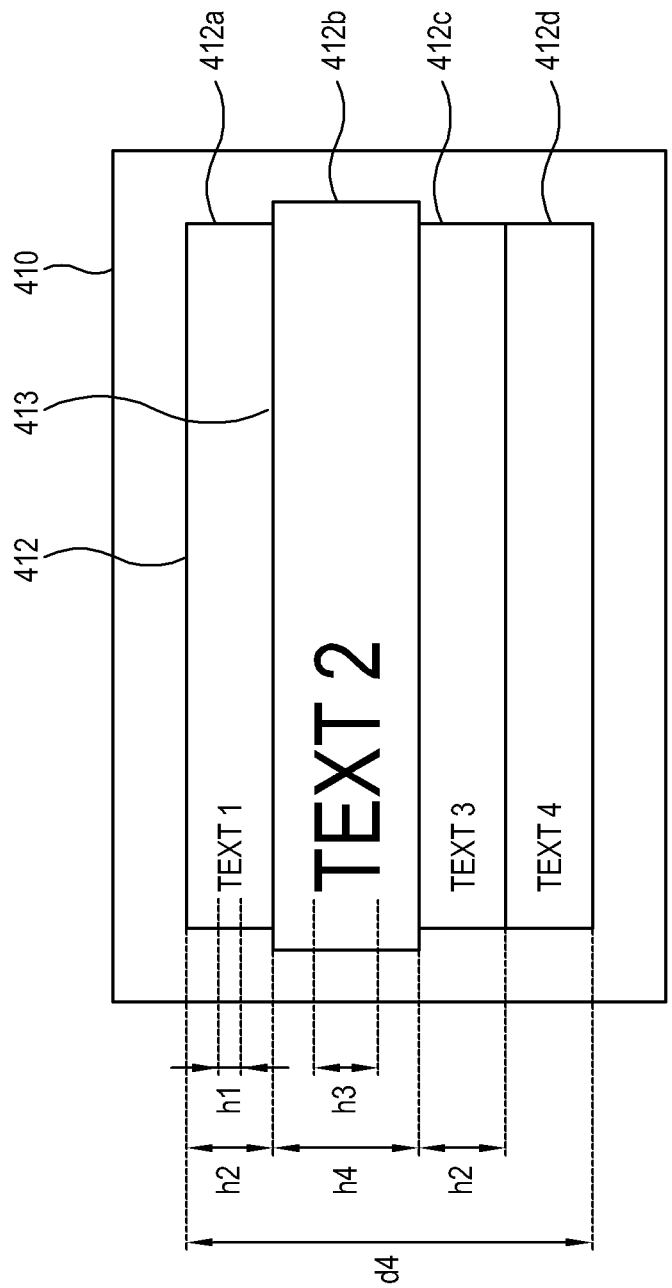

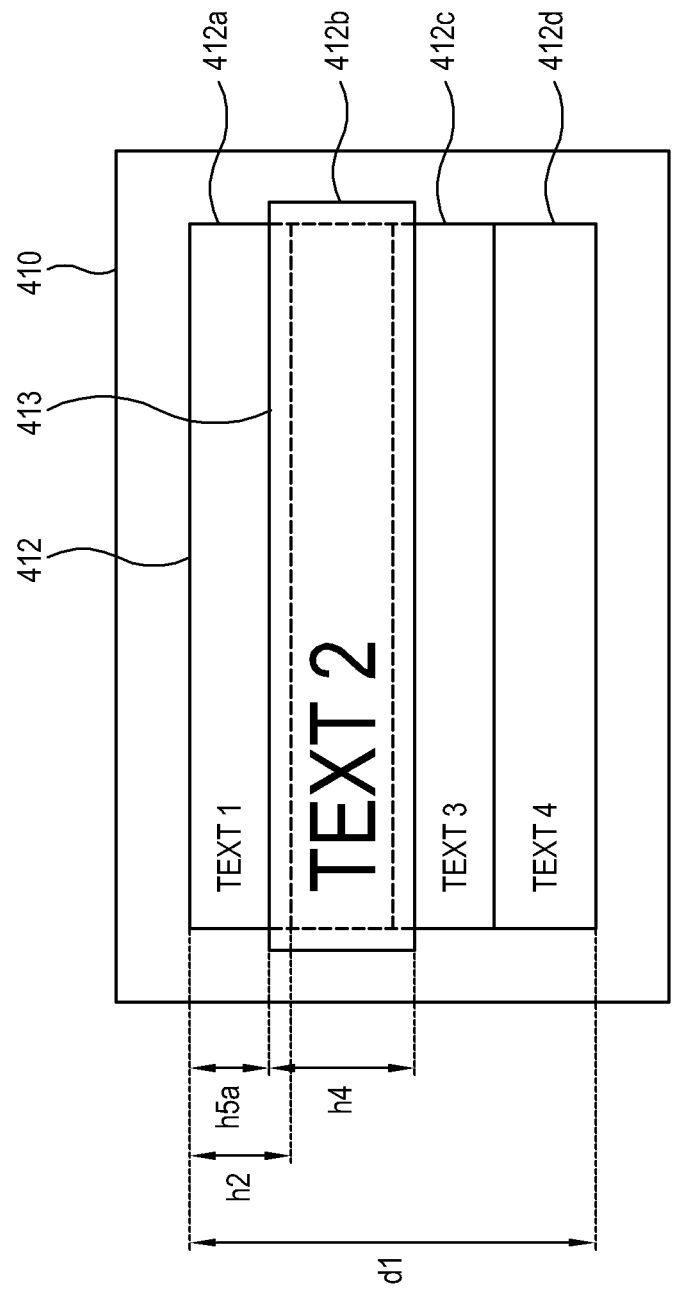

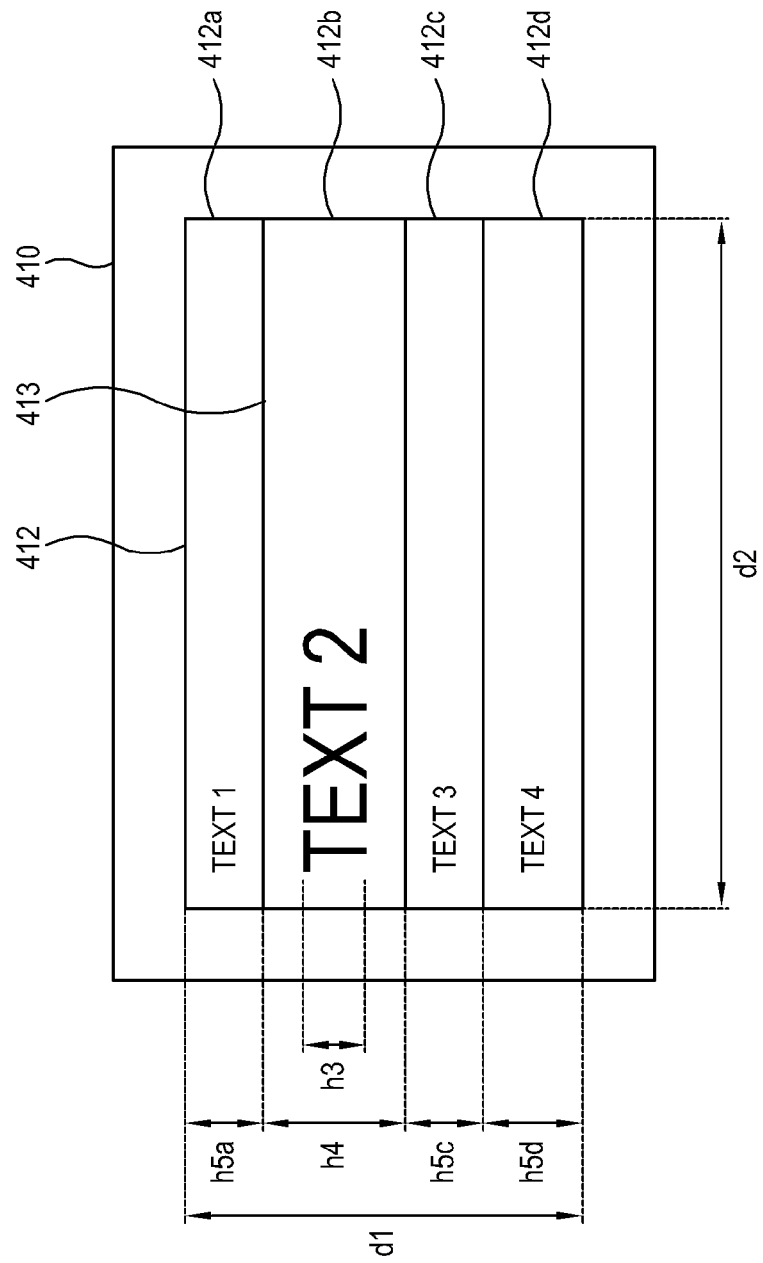

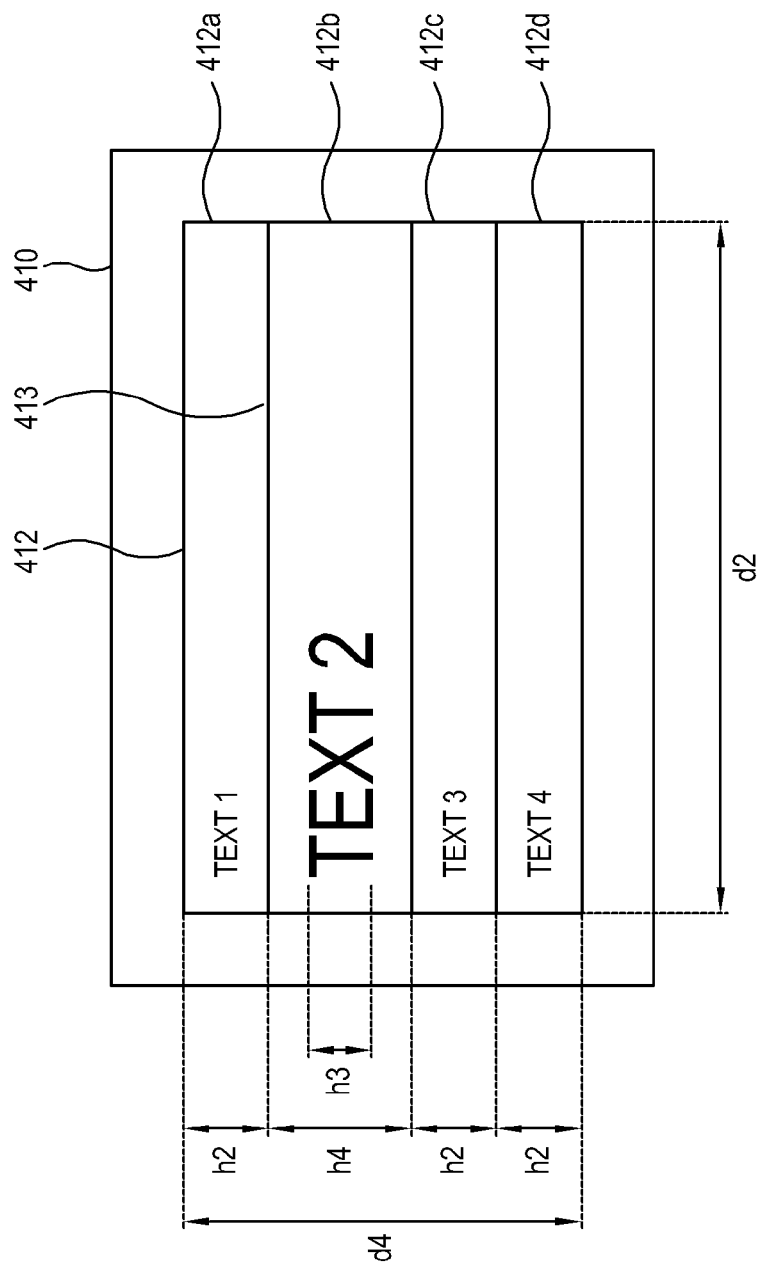

IMAGE FORMING APPARATUS AND ENLARGEMENT DISPLAY METHOD OF TARGET AREA THEREOF

CROSS-REFERENCE TO RELATED APPLICATIONS

This application claims the benefit of priority from Korean Patent Application No. 10-2009-0104589, filed on Oct. 30, 2009, in the Korean Intellectual Property Office, the disclosure of which is incorporated herein by reference in its entirety.

BACKGROUND

1. Field of the Invention

Apparatuses and methods consistent with the present general inventive concept relate to an image forming apparatus and an enlargement display method of a target area thereof, and more particularly, to an image forming apparatus and an enlargement display method of a target area thereof which enlarges and displays a target area on a touch screen of the image forming apparatus.

2. Description of the Related Art

An image forming apparatus forms an image on a print medium such as a document. Examples of image-forming apparatuses include a printer, a photocopier, a facsimile, a multi-function device which has at least two functions, etc.

The image forming apparatus includes a user input unit to receive data or various commands from a user. The user input unit may include an input button (hard key) to represent functions of the image forming apparatus or numbers or a touch screen (touch pad) displayed on a display unit such as liquid crystal display (LCD) to receive a user's input by touch.

A user may select a desired menu and inputs data or a command through the input button or the touch screen.

Generally, the image forming apparatus has a display unit that is limited in size due to its function or location. To receive a user's command via the touch screen, the image forming apparatus may support a zooming function to enlarge a display on the touch screen. A conventional zooming function enlarges and displays a part of a screen like a magnifying glass and hides the remaining part of the screen. Thus, a user must continue to manipulate the image forming apparatus to display areas other than the enlarged target area, and it may be difficult to move the target area which may cause inconvenience to a user.

SUMMARY

Accordingly, it is a feature of the present general inventive concept to provide an image forming apparatus and an enlargement display method of a target area thereof which enlarges and displays a selected menu as a target area and easily moves the target area through a navigation button for user's convenience.

Additional features and utilities of the present general inventive concept will be set forth in part in the description which follows and, in part, will be obvious from the description, or may be learned by practice of the general inventive concept.

Features and/or utilities of the present general inventive concept may also achieved by an enlargement display method concept of a target area of an image forming apparatus which includes a touch screen, the method including selecting a target zooming function to zoom at least one menu displayed on the touch screen as a target screen to perform at least one of functions of the image forming apparatus, enlarging and displaying at least one menu corresponding to the target area according to the selection, selecting at least one of navigation buttons to move the target area, and moving and displaying the enlarged target area through the selected navigation button.

The method may further include displaying at least one menu list to perform at least one of the functions of the image forming apparatus.

Moving and displaying the target area may include expanding the target area to include at least two of a plurality of menus if the menu list includes the plurality of menus.

Moving and displaying the target area may include moving and displaying the target area by a preset number of menus.

Moving and displaying the target area may further include reducing the target area.

Moving and displaying the target area may include expanding or reducing the target area by a user's drag by touch.

Moving and displaying the target area may include moving the target area to include a top menu if it is selected to move down the target area including a bottom menu and moving the target area to include a bottom menu if it is selected to move up the target area including a top menu.

The navigation button may be provided to move the target area up and down or left and right.

Selecting the target zooming function may include selecting a button corresponding to the target zooming function or touching and selecting a voluntary menu area.

Moving and displaying the target area may include applying the target area to an entire menu list displayed on the touch screen and moving the target area including the entire area to a menu list which is not displayed on the touch screen.

Features and/or utilities of the present general inventive concept may also be achieved by an image forming apparatus including a display unit which displays thereon at least one menu list to perform at least one of functions of the image forming apparatus, a user input unit which includes a touch screen displayed on the display unit, and a controller which controls the display unit to enlarge and display at least one menu corresponding to a target area if a target zooming function is selected through the user input unit to zoom at least one menu of the menu list as the target area, and to move and display the enlarged target area according to a user's selection.

The user input unit may include at least one navigation button to move the target area, and the display unit enlarges and displays the target area to include at least two of plurality of menus according to a selection of the navigation button if the menu list includes the plurality of menus.

The display unit may move and display the target area by a preset number of menus.

The display unit may reduce and display the target area.

The user input unit may receive a command to expand or reduce the target area by a user's dragging touch.

The display unit may move and display the target area to include a top menu if it is selected to move down the target area including a bottom menu and may move and display the target area to include a bottom button if it is selected to move up the target area including a top menu.

The navigation button may be provided to move the target area up and down or left and right.

The user input unit may receive a command to select a button corresponding to the target zooming function or selecting the target zooming function by touching a menu area.

The display unit may apply the target area to the entire menu list displayed on the touch screen, and move the target area applied to the entire area to a menu list which is not displayed on the touch screen.

Features and/or utilities of the present general inventive concept may also be realized by a method of displaying a menu on a display device including displaying a menu list including a plurality of menus such that visual elements of the plurality of menus have a first size, enlarging at least a first one of the plurality of menus such that visual elements of the at least one enlarged menu have a second size larger than the first size and such that the visual elements of the rest of the plurality of menus have the first size, and enlarging at least a second one of the plurality of menus located in a first direction with respect to the first menu in response to a user input indicating the first direction.

Enlarging the second menu may include enlarging both the first menu and the second menu simultaneously.

The second menu may be enlarged in response to a user input at an edge of the first menu corresponding to the first direction.

Enlarging the second menu may include reducing a size of the first menu such that the visual elements of the first menu have the first size.

Displaying the menu list may include displaying the plurality of menus such that each of the menus has a first width in the first direction, and enlarging the first menu may include increasing the width of the first menu in the first direction.

Enlarging the first menu may include increasing the length of the first menu in a second direction perpendicular to the first direction.

The menu list may be displayed on a display, and enlarging the first and second menus may include keeping each visual element of each of the first and second menus displayed on the display.

Enlarging the first menu may include increasing a size of the first menu symmetrically about a center axis parallel to the first direction.

The entire first menu may be enlarged when a point on the first menu is selected.

Features and/or utilities of the present general inventive concept may also be realized by a display device including a display and a controller to cause the display to display a menu list including a plurality of menus such that visual elements of the plurality of menus have a first size, to enlarging at least a first one of the plurality of menus such that visual elements of the at least one enlarged menu have a second size larger than the first size and such that the visual elements of the rest of the plurality of menus have the first size, and to enlarge at least a second one of the plurality of menus located in a first direction with respect to the first menu in response to a user input indicating the first direction.

The display may be a touch-screen and the user input indicating the first direction is a touch on the touch-screen.

The controller may cause the display to enlarge the second menu simultaneously with the first menu when the user input may include a touch at a border of the first menu corresponding to the first direction.

The controller may cause the display to enlarge the second menu and reduce the size of the first menu such that the visual elements of the first menu have the first size.

The user input may be received via a button adjacent to the display.

The controller may cause the display to display the plurality of menus such that each of the menus has a first width in the first direction and enlarging the first menu may include increasing the width of the first menu in the first direction.

Causing the display to enlarge the first menu may include increasing the length of the first menu in a second direction perpendicular to the first direction.

Causing the display to enlarge the first menu and the second menu may include keeping each visual element of each of the first and second menus displayed on the display.

Causing the display to enlarge the first menu may include increasing a size of the first menu symmetrically about a center axis parallel to the first direction.

Causing the display to enlarge the first menu may include enlarging the entire first menu when a point on the first menu is selected.

BRIEF DESCRIPTION OF THE DRAWINGS

The above and/or other aspects of the present general inventive concept will become apparent and more readily appreciated from the following description of the embodiments, taken in conjunction with the accompanying drawings of which:

FIGS. 1A and 1B are block diagrams of an image forming apparatus according to an exemplary embodiment of the present general inventive concept;

FIG. 2 illustrates a touch screen according to an exemplary embodiment of the present general inventive concept;

FIGS. 5A and 5B illustrate a movement of the target area in the touch screen according to another exemplary embodiment of the present general inventive concept;

FIGS. 13A-13F illustrate configurations of a target panel according to embodiments of the present general inventive concept;

DETAILED DESCRIPTION OF THE EMBODIMENTS

Figure 1B:
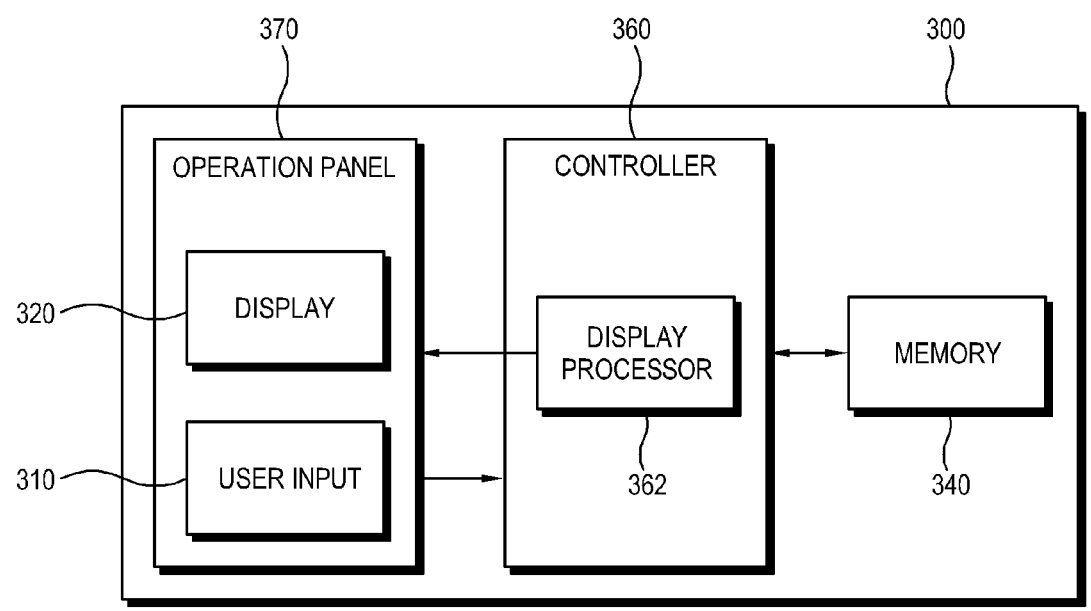

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1A is a block diagram of an image forming apparatus 100 according to an exemplary embodiment of the present general inventive concept. The image forming apparatus 100 according to the present general inventive concept may include a printer, a photocopier, a scanner, a facsimile, or a multi-function device which has at least two functions.

As shown therein, the image forming apparatus 100 according to the exemplary embodiment of the present general inventive concept includes a user input unit 110, a display unit 120, an image forming unit 130, a storage unit 140, a communication unit 150 and a controller 160.

The user input unit 110 receives data or a command from a user. The user input unit 110 includes an input button 111 (hereinafter, to be also called hard key or key pad) which is provided in the image forming apparatus 100, and a touch screen 112 (hereinafter, to be also called touch panel or touch pad) which receives a command by user's touch.

The touch screen 112 may include a graphic user interface (hereinafter, to be also called UI) which is generated by an execution of a predetermined application and displayed on the display unit 120 to receive a user's input by touch.

The GUI according to the present general inventive concept may include at least one menu list which is displayed on an initial screen (hereinafter, to be also called standby screen or background screen) of the image forming apparatus 100 to execute at least one of functions of the image forming apparatus 100.

The image forming apparatus 100 according to the present general inventive concept may further include an electronic pen (or digital pen) additionally provided for a user's input by handwriting and an optical character reader (OCR) as the user input unit 100 which recognizes characters by the electronic pen.

A user may perform a log-in process through the user input unit 110 to input ID and password assigned for each user account. The log-in may include an administrator log-in which allows setting and change of all the environments of the image forming apparatus 100 without an additional access limit.

The image forming apparatus 100 identifies and permits a user's log-in or administrator log-in. A user according to the present general inventive concept may include an administrator.

The display unit 120 displays a setting and operation status of the image forming apparatus 100 and may display a UI screen to receive various commands from a user. The display unit 120 may include a thin film transistor-liquid crystal display (TFT-LCD) and a driver (not shown) to drive the TFT-LCD, for example.

The user input unit 110 of the image forming apparatus 100 according to the present general inventive concept may be an icon on the display unit 120 to be selected by a user by touching the touch screen 112. Thus, the user input unit 110 and the display unit 120 may be provided as a single component or device instead of separate components or devices.

The single configuration of the user input unit 110 and the display unit 120 of the image forming apparatus 100 according to the present general inventive concept is called an operation panel equipment (OPE).

The display unit 120 includes the touch screen 112 that displays thereon at least one menu list to execute a function of the image forming apparatus 100.

FIG. 2 illustrates a touch screen 1 according to an exemplary embodiment of the present general inventive concept.

As illustrated in FIG. 2, if a user touches a target zooming function from the touch screen 1, the display unit 120 may enlarge, i.e., zoom and display, at least one menu from a plurality of displayed menus.

The touch screen 1 in FIG. 2 may include at least one of navigation buttons 31 and 32 to move (e.g., up and down) the enlarged target area 20. A user may touch one of the navigation buttons 31 and 32 and move the enlarged target area 20 up and down. The movement of the target area 20 may include an expansion movement in which a menu above or below the target area 20 is included within the target area 20 or a reduction in which a menu at a top or bottom of the target area 20 is removed from the target area 20. For example, if the target area includes two menus 1b and 1c, and the touch screen 1 displays a total of four menus 1a, 1b, 1c, and 1d, the user may perform a reduction operation to cause the target area 20 to display only one menu, such as 1b, so that three menus, such as 1a, 1c, and 1d are included in the non-target area of the touch screen 1.

FIG. 2 illustrates a pair of icons as the navigation buttons 31 and 32 to move the enlarged target area 20 up and down, but the navigation buttons are not limited thereto.

Alternatively, the navigation buttons 31 and 32 may include a pair of icons to move the target area 20 left and right, a single button or icon. Alternatively, the target area 20 may scroll up or down the menus based on a scrolling motion of a user input, such as a finger stylus, or other input. In yet another alternative, buttons located adjacent to the touch screen 1 may be used to move the target area 20 up or down. Further, the navigation buttons 31 and 32 may include icons such as identifiable marks including an arrow, star, square, circle, or text or graphic as well as the icons as in FIG. 2, which are not limited in shape or color.

Referring again to FIG. 1A, the image forming unit 130 may form an image on at least one print medium, such as paper, based on print data upon receiving a print command. A print operation may include a print operation of received fax data, a print operation to copy a scanned document, and a print operation for print data received from the outside through a host apparatus 201 including a server or print data stored in an inside (hard disk drive) or outside (USB memory stick) of the image forming apparatus 100.

The storage unit 140 may store various data including print data, fax data to transmit a fax, image data scanned by an image scanner (not shown), data received from the outside connected through the communication unit 150, various setting information of the image forming apparatus 100 through the user input unit 110, user certification information for each user account, and usage authorization information. The storage unit 140 may further store therein data received from the outside through the communication unit 150 (including fax data).

The storage unit 140 may include an internal storage medium such as HDD or an external or portable storage medium such as USB memory, a memory card (memory stick, CF card, and MMC), or a memory card slot.

The communication unit 150 performs a data communication with devices external to the image-forming apparatus 100, such as the host apparatus 201 and the server 202, and receives print data in a predetermined print language from the outside.

The communication unit 150 may include a wired/wireless communication module connected to an external device such as a host device by a local connection or in a network by a predetermined protocol, or an interface (e.g. USB port) connected to a portable storage medium such as a USB memory.

The communication unit 150 may include a fax communication module (e.g., modem) which converts image data generated by the image scanner into a fax signal and transmits the fax signal to an external fax machine (including a multi-function device having a fax function) by using a public switched telephone network (PSTN) or receives a fax signal from the outside.

The communication unit 150 may perform a scan to host function or a scan to server function to transmit a scanned image to the host apparatus 201 or an external apparatus such as the server 202 by a predetermined protocol or perform a scan to email function to transmit a scanned image to the outside or perform a scan to USB function to transmit a scanned image to the USB memory.

The controller 160 controls the image forming apparatus 100 as a whole. More specifically, the controller 160 controls the display unit 120 to display thereon a touch screen including at lest one menu list to perform at least one function of the image forming apparatus 100, and controls the display unit 120 to enlarge and display at least one menu as a target area from the menu list if a target zooming function is selected by a user's touch of the displayed touch screen.

FIG. 1B illustrates an example of a display device 300 according to another embodiment of the present general inventive concept. The display device 300 may include an operation panel 370 including a display 320 and a user input 310. The user input 310 may be one or more buttons or keys, a trackball, or other input device near the display 320 to manipulate items on the display. Alternatively, the user input 310 may be a touch-screen function incorporated in the display 320. In such a case, the user input 310 may include the capacitive, pressure sensitive, or other user-touch-receptive layers to sense a user touch, a stylus touch, or other touch to the display, and circuitry to convert the touch to electrical signals.

The display device 300 may further include a controller 360 including at least one processor, such as the display processor 362, and the display device 300 may further include a data storage device 340, such as one or more memory chips or hard discs. The controller 360 may control the display 320 to display menus selectable by a user, may receive user input, and may adjust the display according to the user input. The controller 360 may receive commands, addresses, and data from the data storage device 340 to perform the display functions.

The display device 300 may include other functional units such as an external device communication unit (not shown) which may include wired or wireless terminals, a power control unit (not shown), data ports (not shown), or any other functional units. Examples of display devices include cell phones, kiosks, ATM machines, or other machines to dispense goods, transaction terminals, such as terminals at grocery stores, gas stations, or other commercial locations to receive user inputs and display data to a user, or any other display device.

FIGS. 3A to 3D illustrate the enabled target area 20 and movement thereof in the touch screen 1 according to the exemplary embodiment of the present general inventive concept.

Figure 3A:
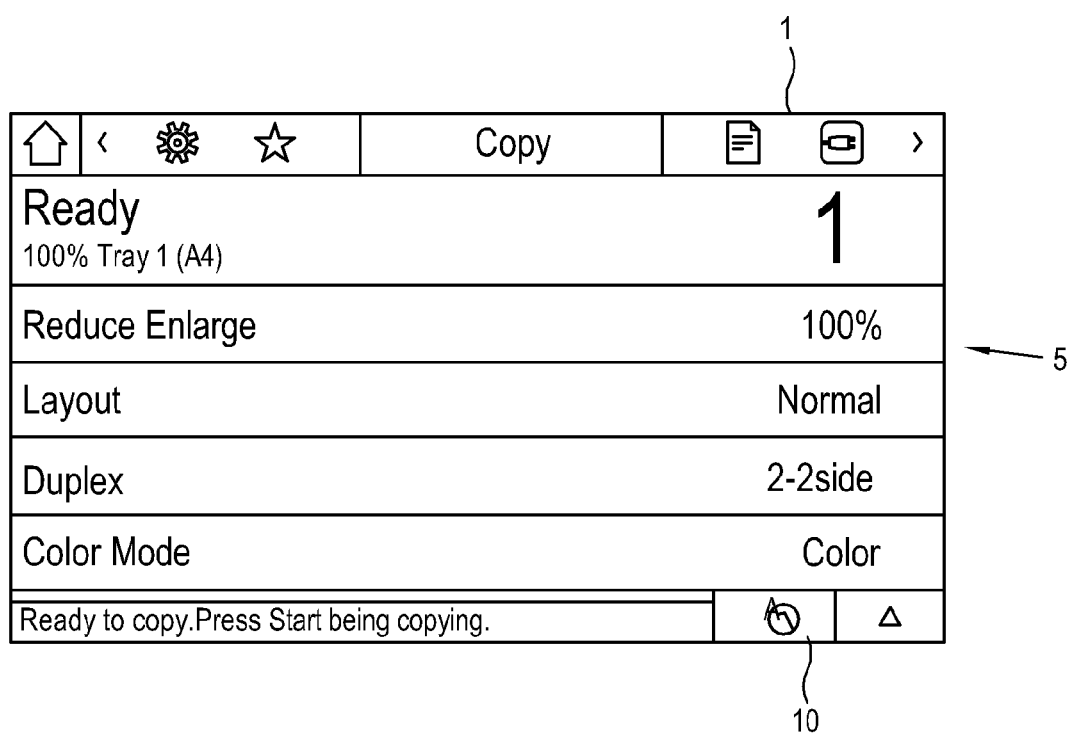
FIGS. 3A to 3D illustrate an enabled target area and movement thereof in the touch screen according to an exemplary embodiment of the present general inventive concept.

As shown in FIG. 3A, the controller 160 controls the display unit 120 to display thereon at least one menu list on the touch screen 1 to perform a function of the image forming apparatus 100. The touch screen 1 which includes at least one menu list may include an initial screen 5 (standby screen or background screen) of the display unit 120.

A user may touch a button 10 from the touch screen 1 in FIG. 3A to perform the target zooming function. If a user touches the target zooming button 10 in FIG. 3A, the target zooming function is enabled, and at least one menu as the target area 20 is enlarged and displayed as shown in FIG. 3B.

Figure 3B:
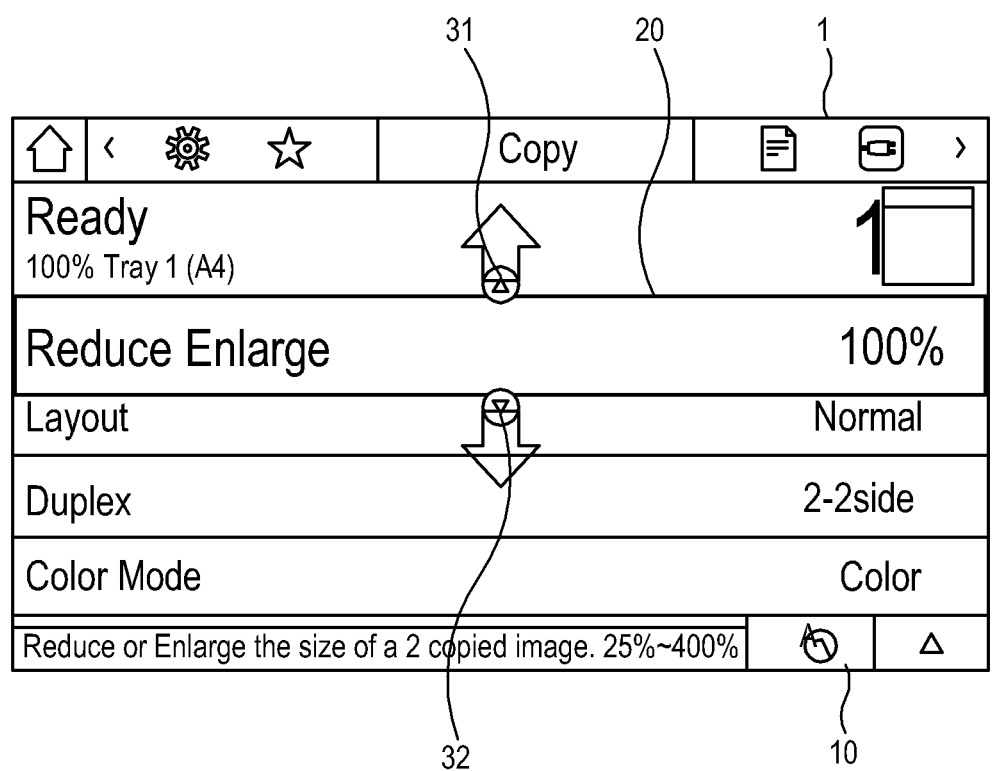

The target area 20 which is enlarged by a touch of the target zooming button 10 may include a top menu of the displayed menu list as in FIG. 3B.

The controller 160 may control the display unit 120 to enlarge the target zooming menu included in the target area 20 to the extent the enlargement does not affect readability of the remaining menu (non-target zooming menu). For example, the target zooming menu may be enlarged by approximately 25% to 30%.

If an enlargement rate of the target zooming menu is high, the controller 160 may control the display unit 120 to display the target zooming menu in a transparent or semi-transparent manner so that a user can view the non-target zooming menu.

As illustrated in FIG. 3B, the touch screen 1 may include at least one of navigation buttons 31 and 32 to move the enlarged target area 20 (e.g. up and down). The movement of the target area 20 may include an expansion to include another menu in the target area 20 or a reduction to remove a menu from the target area 20.

Figure 3C:
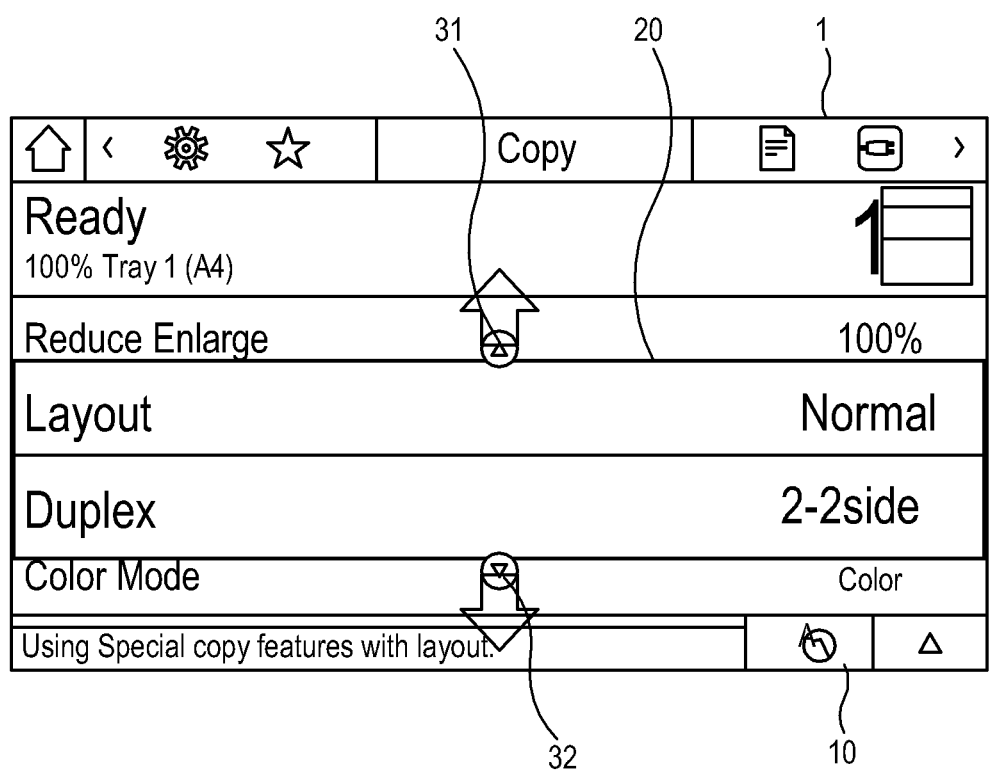

For example, if the target area 20 includes a top menu of the plurality of menu lists as illustrated in FIG. 3B, the controller 160 may control the display unit 130, upon selection of the navigation button 32 by a user, to enlarge the target area 20 to include lower menu as shown in FIG. 3C. Although FIG. 3C illustrates an example in which the target area 20 is both enlarged and moved to include two menus below the original targeted menu (as illustrated in FIG. 3B), the target area 20 may be enlarged to include both the original targeted menu and one or more adjacent menus, without de-targeting the original menu.

If the menu list of the touch screen 1 includes a plurality of menus, the controller 160 may control the display unit 120 to display the target area 20 including at least two of the plurality of menus according to a selection of the navigation buttons 31 and 32.

That is, the controller 160 may control the target area 20 to expand and move to include at least two of the plurality of menus as in FIG. 3C. The number of expanded menus of the target area 20 may be preset and stored in advance in the storage unit 140.

If a user selects the navigation button 32 moving downwards in FIG. 3C, the display unit 120 moves the target area 20 to the next lower menu and enlarges and displays the menu of the target area 20. The controller 160 may control the display unit 120 to move and display the target area 20 by a pre-set number of menus (e.g., by two menus).

Figure 3D:
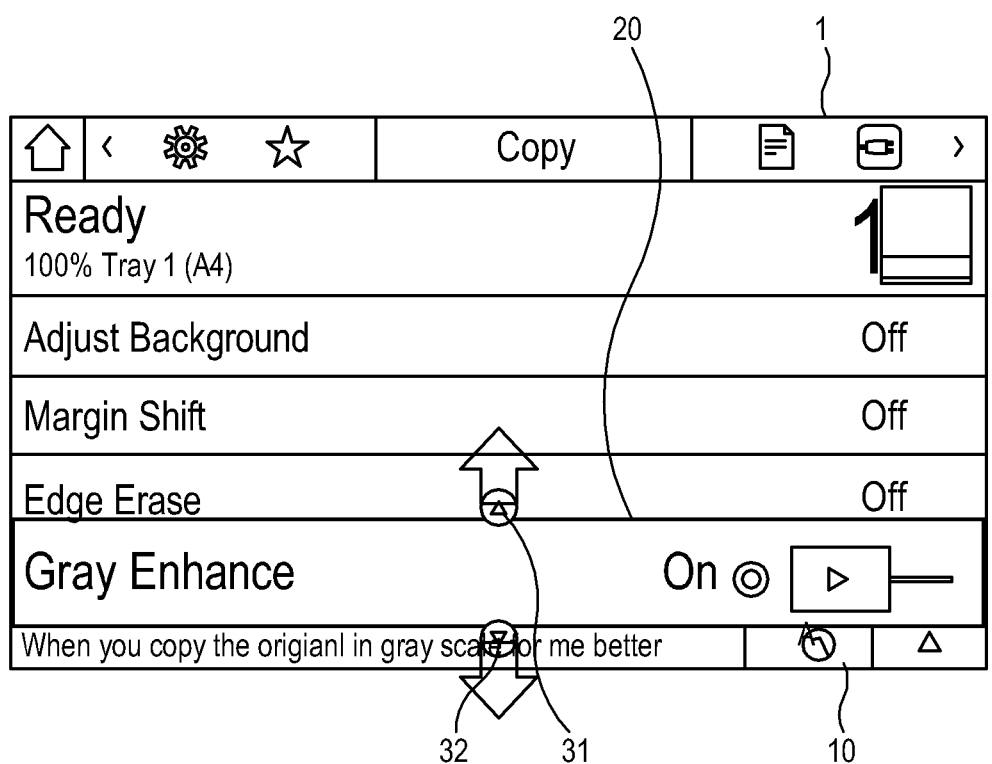

If a user again selects the navigation button 32 moving downwards while the target area 20 includes a bottom menu, the controller 160 controls the display unit 120 to move and display the target area 20 to the bottom menu, as illustrated in FIG. 3D.

Figure 4A:
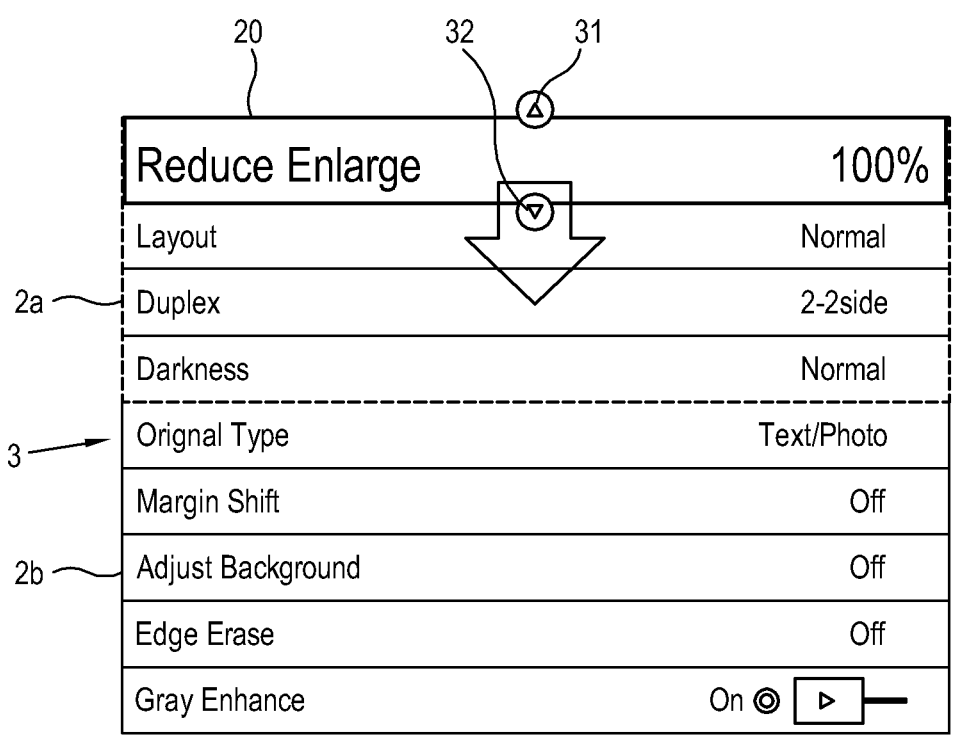
FIGS. 4A to 4C illustrate a movement of the target area in the touch screen according to an exemplary embodiment of the present general inventive concept.
Figure 4B:
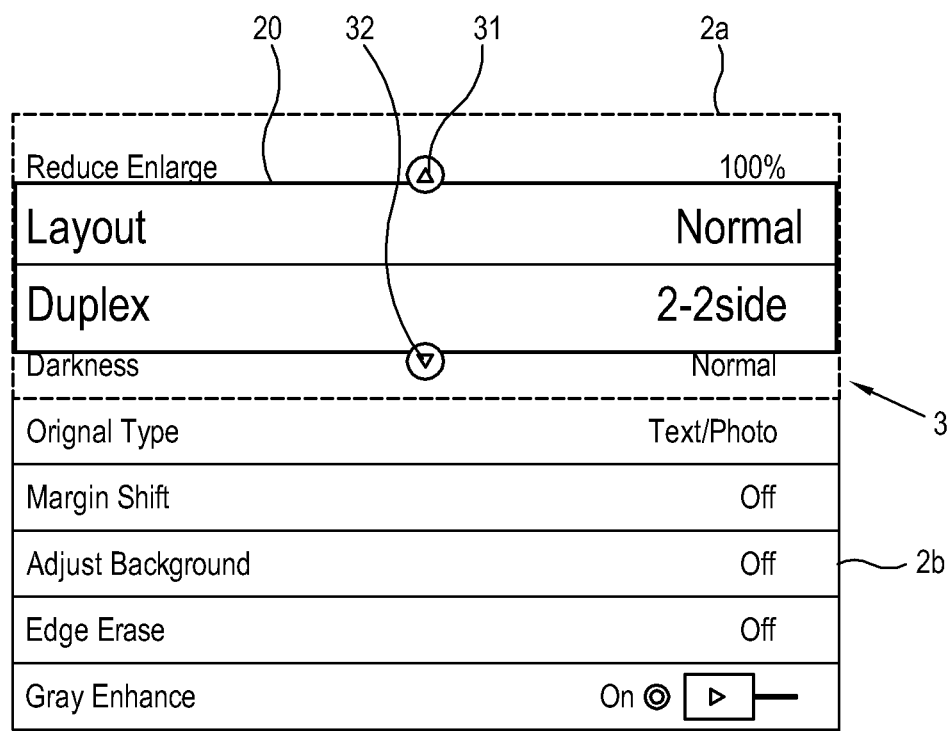
Figure 4C:
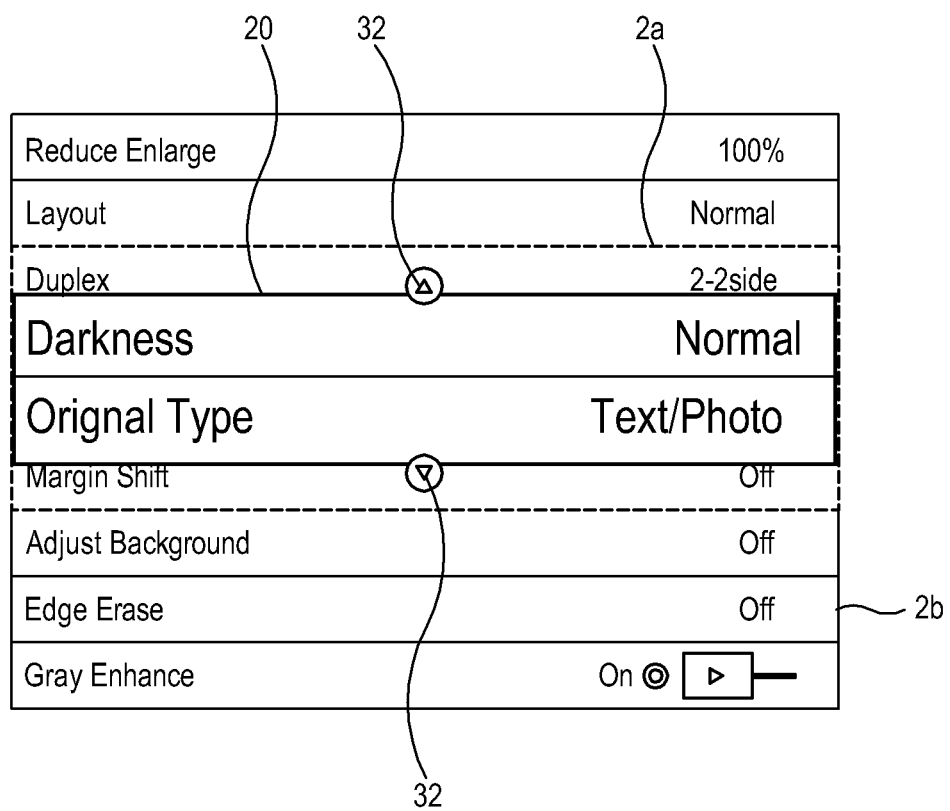

FIGS. 4A to 4C illustrate a movement of the target area 20 of the touch screen 1 according to the exemplary embodiment of the present general inventive concept.

In FIGS. 4A to 4C, a displayed part of a plurality of menus in the touch screen 1 is a menu displaying area 2a, and the menus that are not displayed are represented as the non-displayed area 2b. FIGS. 4A to 4C illustrate non-displayed part of the plurality of menus together with the menu displaying area 2 for purposes of convenience, even though the non-displayed menus would not exist other than as code stored in the storage device 140 when not displayed.

As shown in FIG. 4A, if a user selects the target zooming function, a top menu is enlarged and displayed as the target area 20. If a user selects the lower navigation button 32, the display unit 120 may expand the target area 20 and display the next lower menu as part of the target area 20 as shown in FIG. 4B.

If a user viewing the displayed area 2a of FIG. 4B selects the lower navigation button 32 to move the target area 20 to the next lower menus, the display unit 120 moves the target area 20 and displays the next lower menus as the target area 20 as illustrated in FIG. 4C. Although in FIG. 4C the menus in the target area 20 are both different from the menus in the target area of FIG. 4B, the movement of the target area is not limited to the number of menus in the target area 20. For example, if the target area 20 includes two menus as illustrated in FIG. 4B, and if a user selects the lower navigation icon 32, the target menu may move down only one menu to include the lower menu of the target area 20 illustrated in FIG. 4B ("Duplex") and the next lower menu, in this case, the menu entitled "Darkness."

Even if a menu is not displayed in the displayed area 2a of the touch screen 1, it may be enlarged and displayed according to the movement of the target area 20 as in FIG. 4C. In particular, although the menu entitled "Original Type" is not located within the displayed area 2a of the touch screen 1 of FIG. 4B, when a user selects the lower navigation icon 32, the menu list may scroll down so that the menu entitled "Original Type" is included within the displayed area 2a and the target area 20.

Figure 5A:
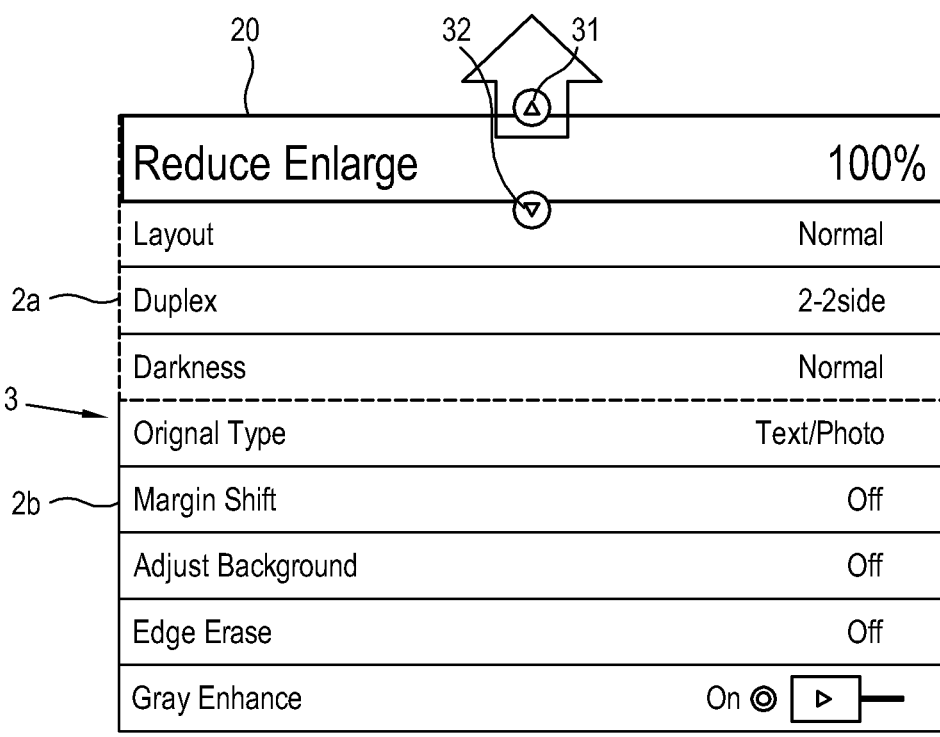

FIGS. 5A and 5B illustrate a movement of the target area 20 of the touch screen 1 according to another exemplary embodiment of the present general inventive concept.

As shown in FIG. 5A, if a user selects the navigation button 31 to move the target area 20 when the target area 20 includes a menu at the top of the menu list, the display unit 120 enlarges and displays a menu at the bottom of the menu list as the target area 20.

Likewise, if a user selects the navigation button 32 to move the target area 20 down when the target area 20 is at a bottom menu of the menu list, the display unit 120 may enlarge and display a top menu of the menu list as the target area 20.

As the target menu 20 may move from the top menu to the bottom menu and vice versa, a user may easily move the target area 20 to all the menus displayed on the menu list with only a single navigation button, if desired.

Figure 6A:
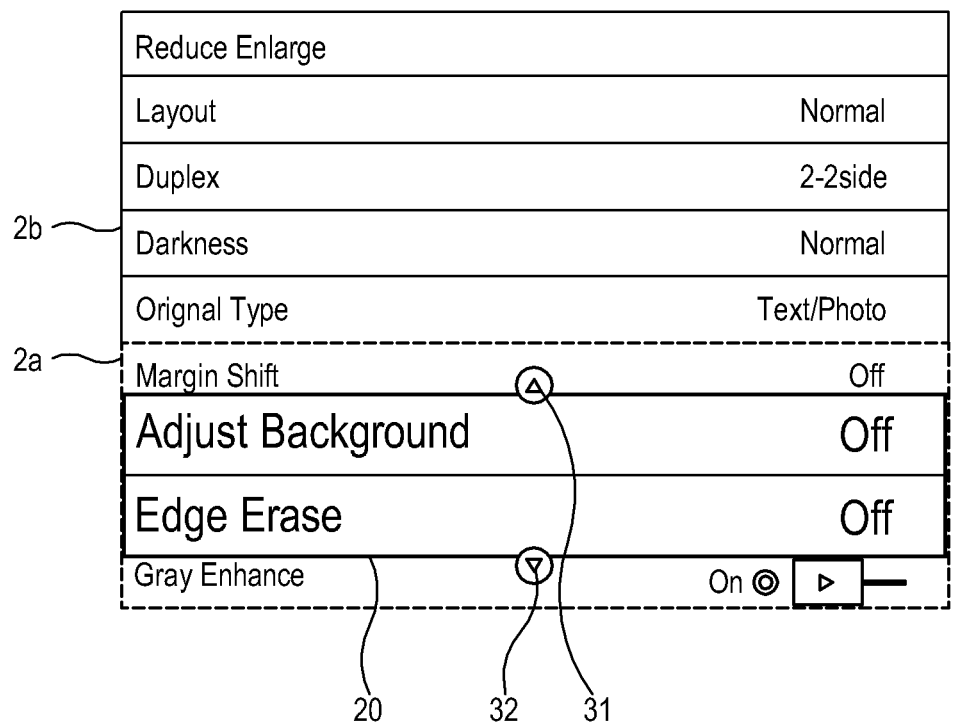
FIGS. 6A and 6B illustrate a reduction of the target area according to an exemplary embodiment of the present general inventive concept.
Figure 6B:
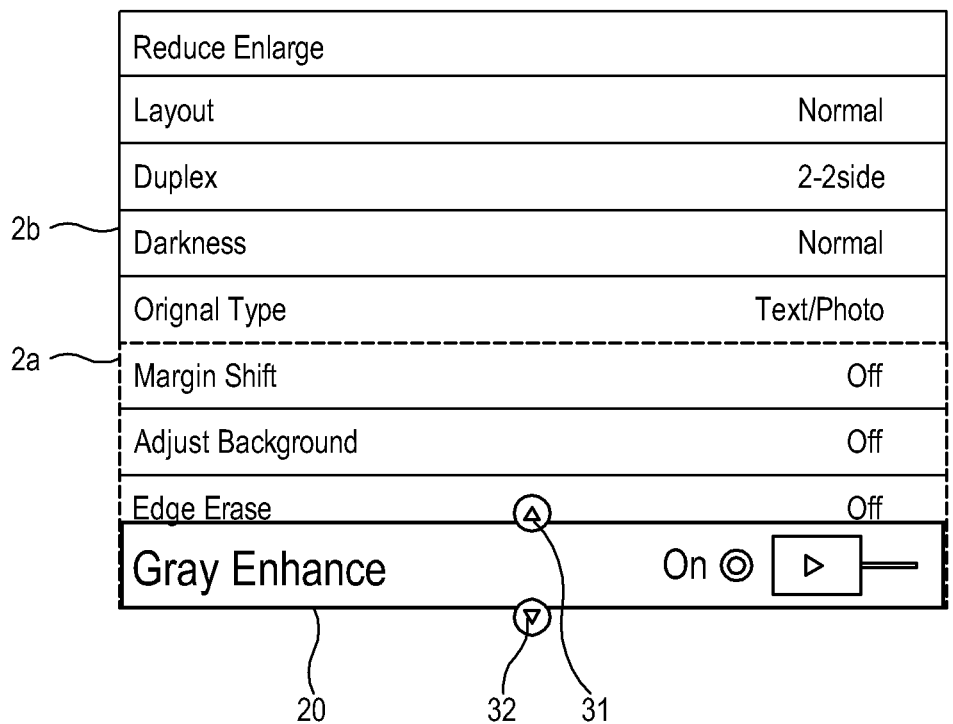

FIGS. 6A and 6B illustrate a reduction of the target area 20 according to the exemplary embodiment of the present general inventive concept.

As shown in FIG. 6A, if a user selects the navigation button 32 to move the target area 20 down along the menu list when the target area 20 is a single menu from the bottom of the menu list, the display unit 120 may reduce the target area 20 to only the bottom menu as illustrated in FIG. 6B. In other words, even if a default setting of the target area 20 is to include two menus in the target area 20, when the target area 20 is moved to include a bottom-most or a top-most menu, the target area 20 may be adjusted to include only one menu.

Figure 7A:
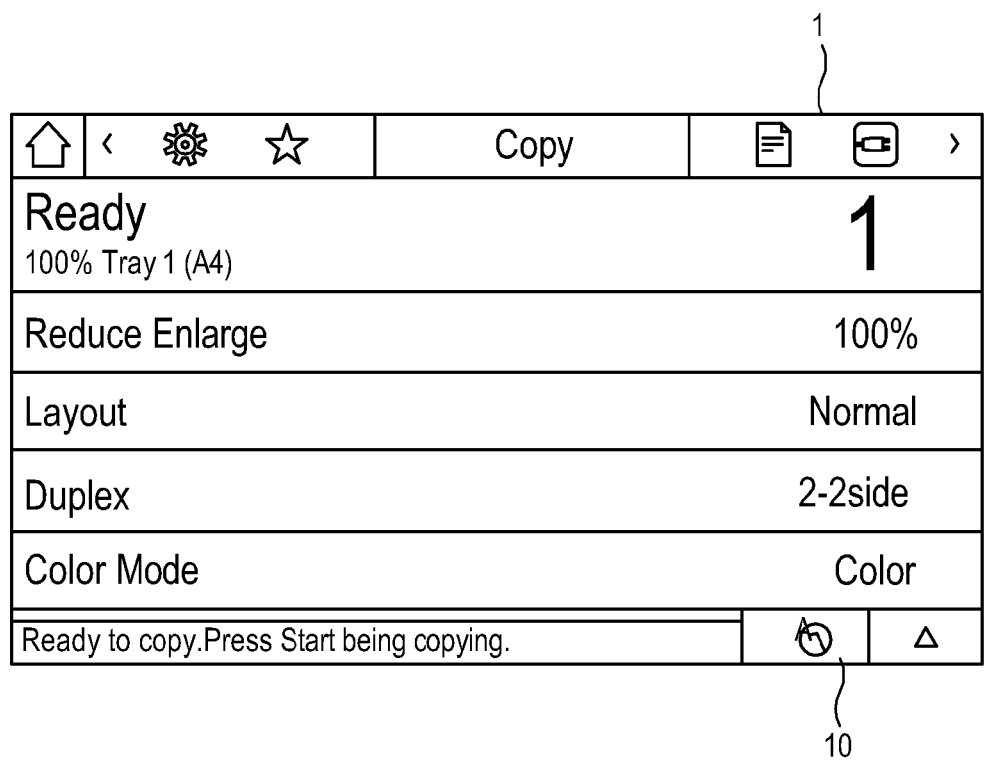
FIGS. 7A to 7C illustrate a calling and a returning of the target area according to an exemplary embodiment of the present general inventive concept.
Figure 7B:
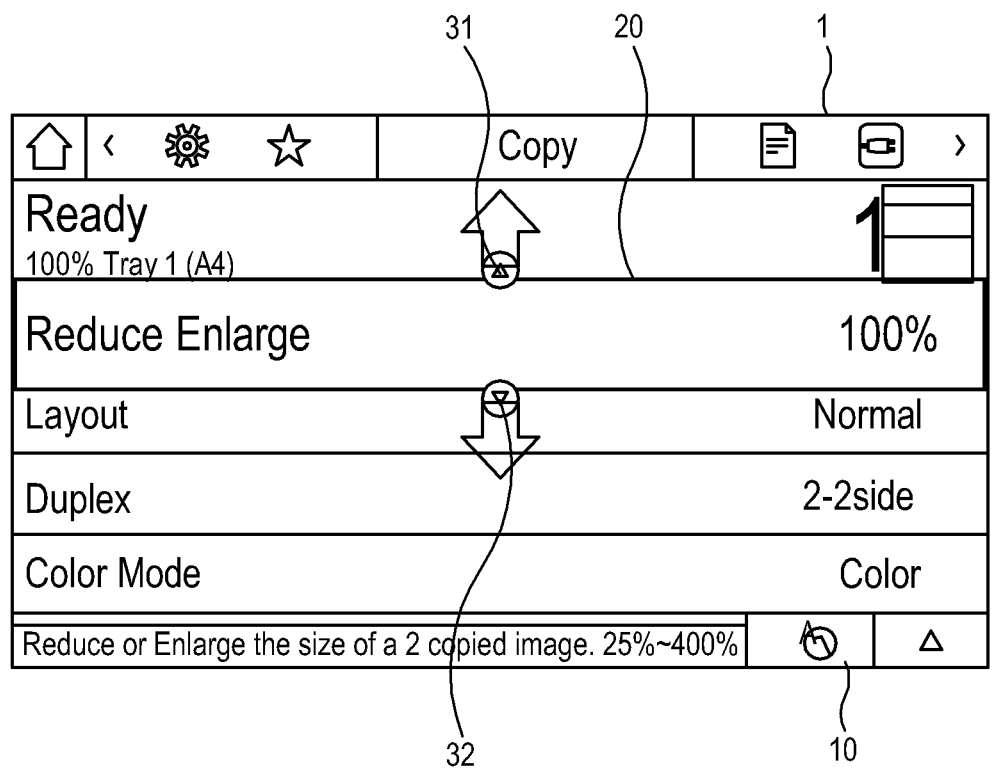
Figure 7C:
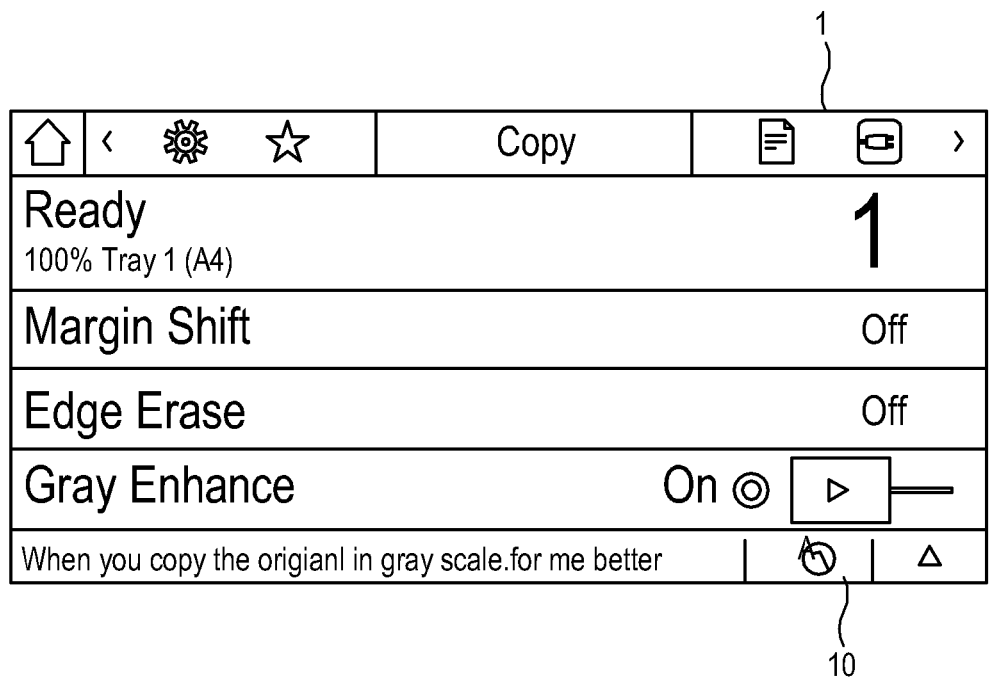

FIGS. 7A to 7C illustrate a calling and a returning of the target area 20 according to an exemplary embodiment of the present general inventive concept.

As shown in FIG. 7A, a user may touch the target zooming button 10 from the touch screen 1 including the plurality of menu lists. If a user touches the target zooming button 10, the target zooming function is enabled as in FIG. 7B and the target area 20 is called to enlarge and display at least one menu.

If a user touches the target zooming button 10 again, the target zooming button is disabled and returns to the initial touch screen 1 as in FIG. 7C. The controller 160 may control the display unit 120 to enlarge and display the menu list from the touch screen 1 as in FIG. 7C.

Figure 8A:
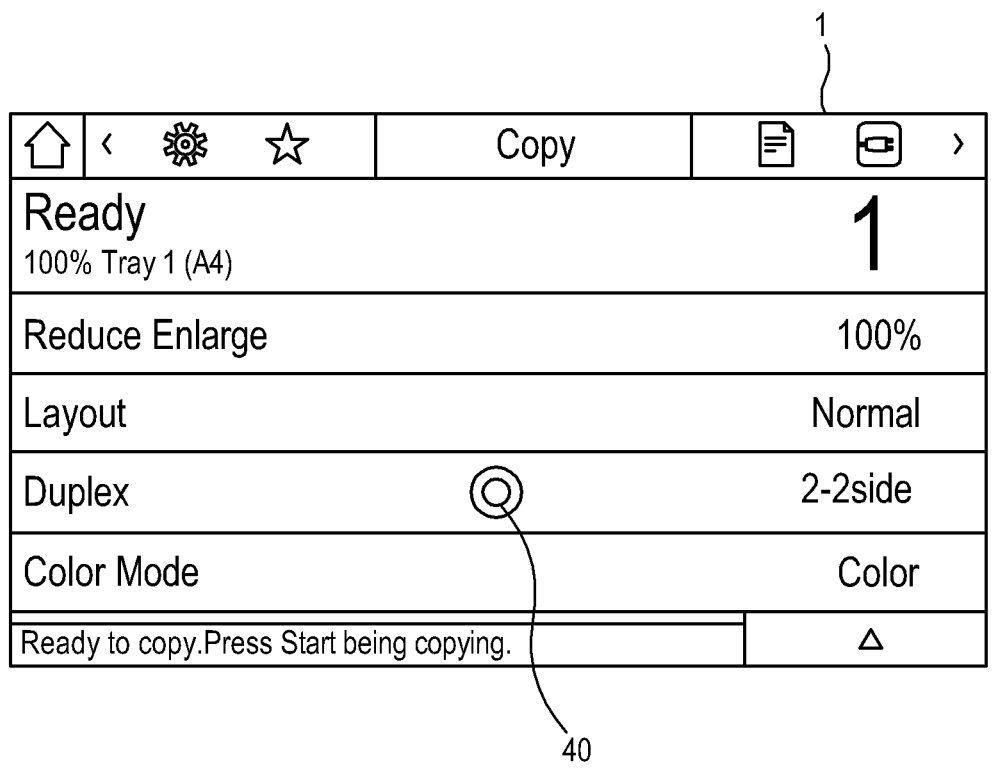
FIGS. 8A and 8B illustrate a calling of the target area according to another exemplary embodiment of the present general inventive concept.
Figure 8B:
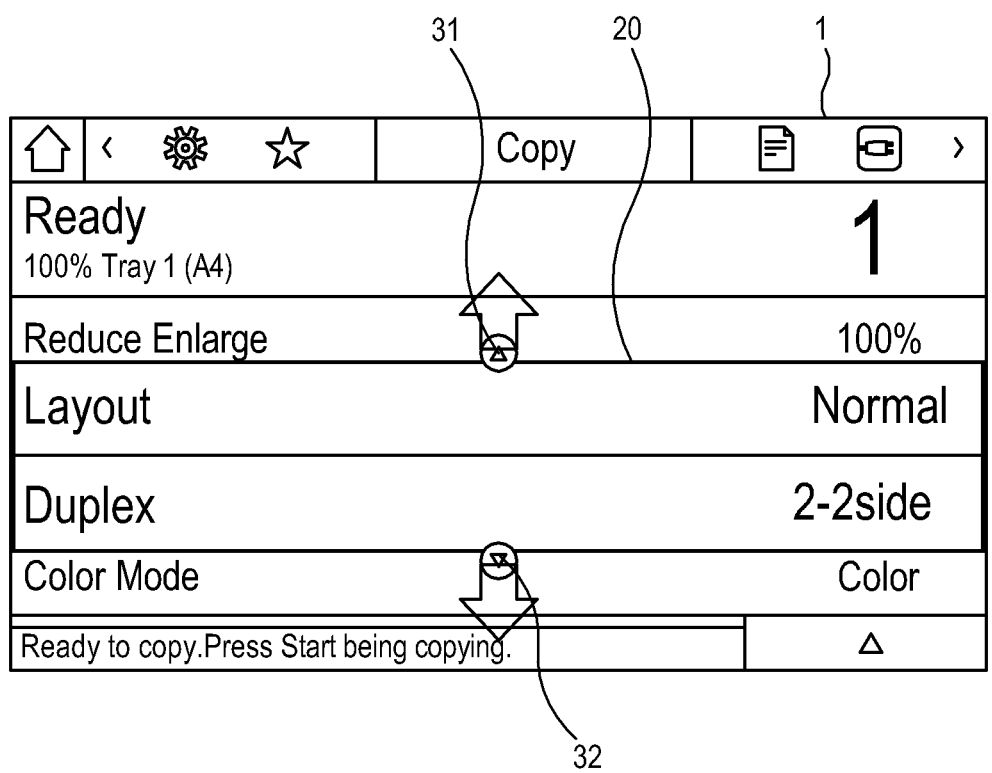

FIGS. 8A and 8B illustrate a calling of the target area 20 according to another exemplary embodiment of the present general inventive concept.

As shown in FIG. 8A, the image forming apparatus 100 according to another exemplary embodiment of the present general inventive concept may receive a user's input by touch with respect to a voluntary menu area 40 of the touch screen 1 including the plurality of menu lists and enable the target zooming function.

If a user's input is received with respect to the voluntary menu area 40 in FIG. 8A, the display unit 120 may enlarge and display the target area 20 including the touched menu as in FIG. 8B. The number of menus displayed in the target area 20 (e.g., two menus) may be preset and stored in the storage unit 140.

Figure 9A:
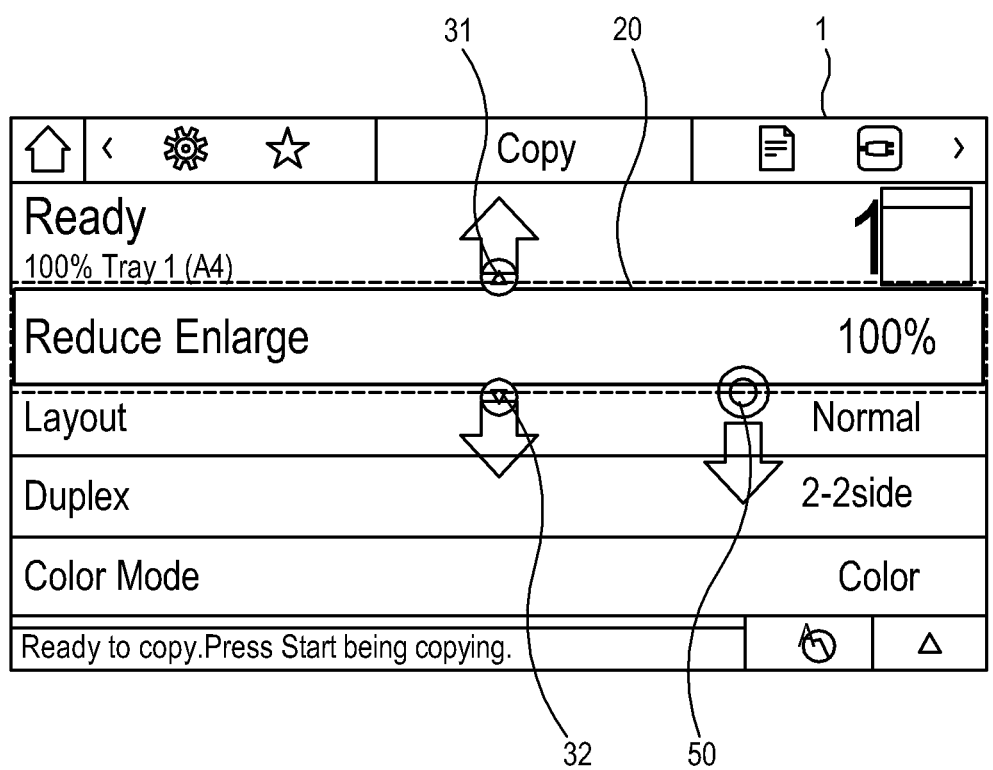
FIGS. 9A to 9C illustrate a movement of the target area according to another exemplary embodiment of the present general inventive concept.
Figure 9B:
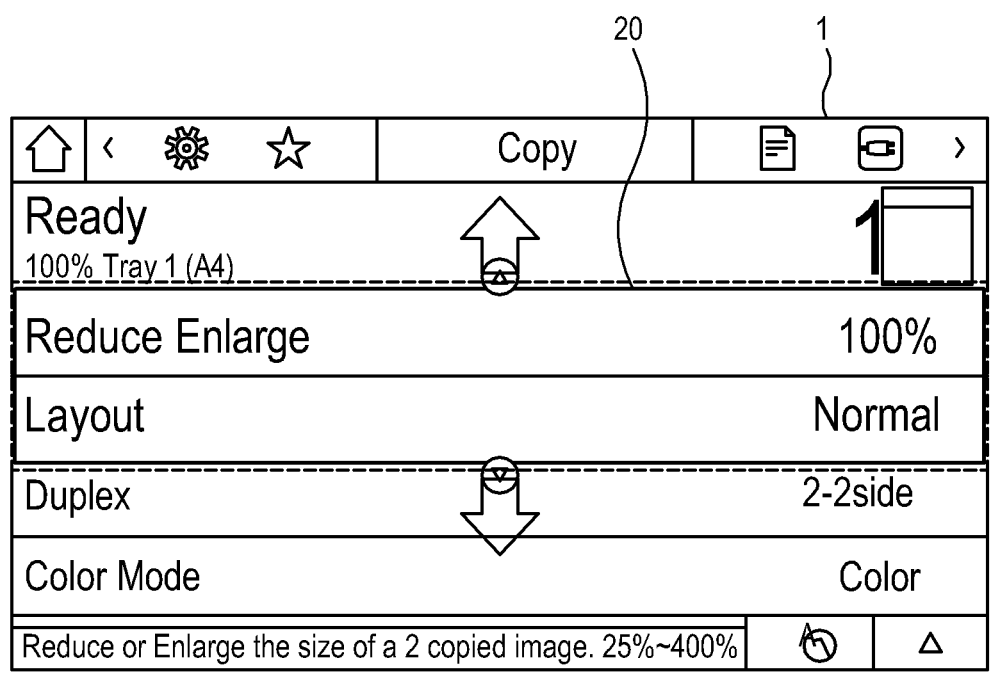
Figure 9C:
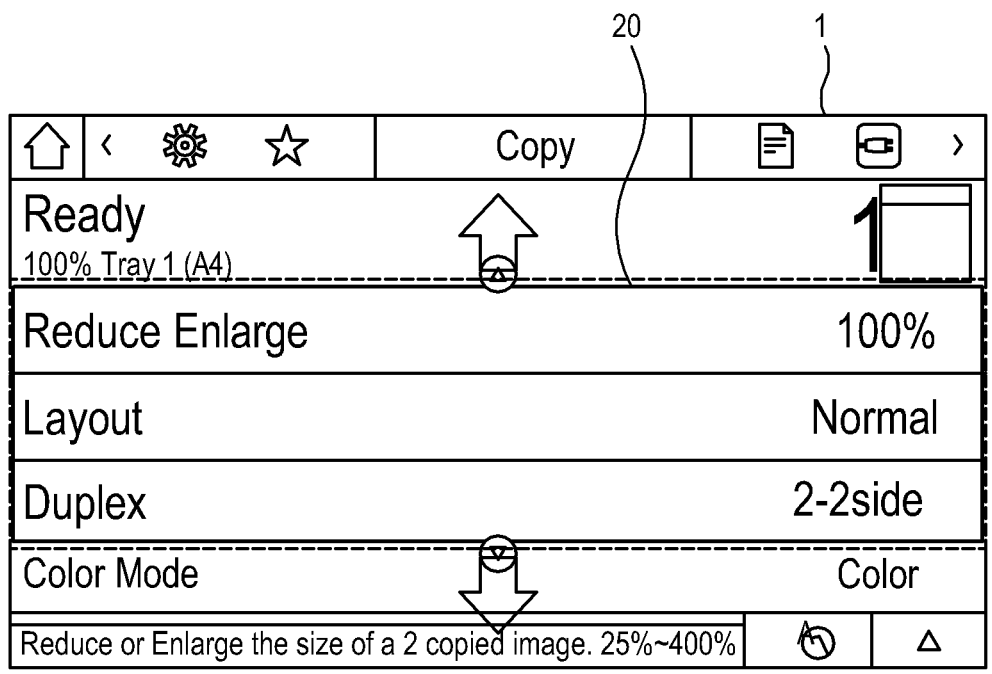

FIGS. 9A to 9C illustrate a movement of the target area 20 according to another exemplary embodiment of the present general inventive concept.

As shown therein, the image forming apparatus 100 according to another exemplary embodiment of the present general inventive concept may enlarge the target area 20 by a user's dragging motion. A dragging motion may include touching and moving up or down (or side to side) a finger, stylus, or other device, while maintaining the touch.

More specifically, if a user drags down a lower boundary 50 of the target area 20 while the target area 20 is enlarged and displayed as illustrated in FIG. 9A, the display unit 120 may enlarge and display the target area 20 including a plurality of menus as illustrated in FIG. 9B.

A user may continue to drag and enlarge the target area 20 as in FIG. 9C until the entire menu displaying area 2a becomes the target area 20 out of the plurality of menu lists. Accordingly, the target area 20 may apply to the entire area of the menu list displayed on the touch screen 1.

On the other hand, if a user drags up a boundary of the target area 20, the display unit 120 may reduce and display the target area 20 until the target area 20 includes only one menu.

Figure 10A:
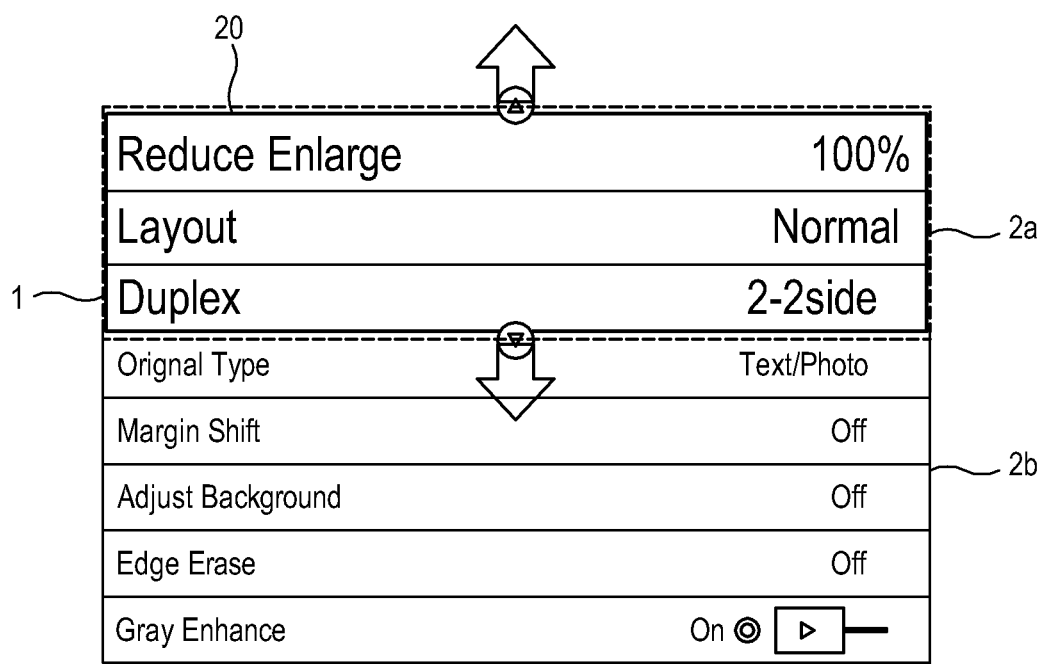
FIGS. 10A and 10B illustrate a movement of the target area according to another exemplary embodiment of the present general inventive concept.
Figure 10B:
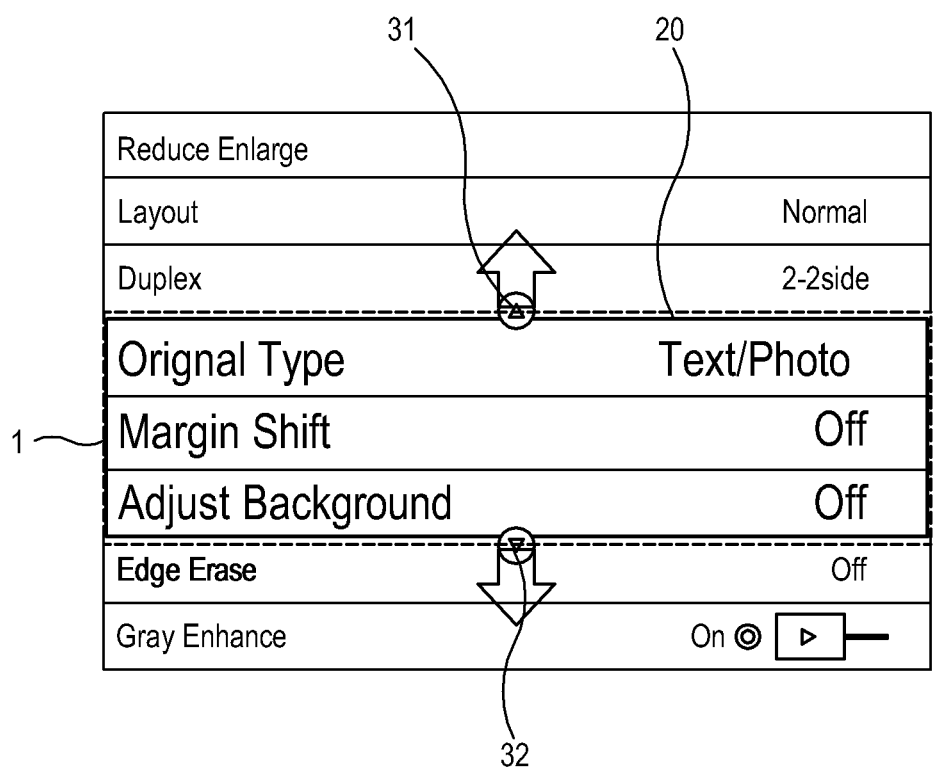

FIGS. 10A and 10B illustrate a movement of the target area 20 according to another exemplary embodiment of the present general inventive concept.

As shown in FIG. 10A, the entire menu displaying area 2a displayed on the display unit 120 is the target area 20 out of the plurality of menu list. If a user selects the navigation button 32 to move the target area 20 down the menu list, the display unit 120 enlarges and displays the lower menu as the target area 20, i.e., it moves and displays the menus in FIG. 10B that are not displayed on the touch screen 1 in FIG. 10A.

Figure 11:
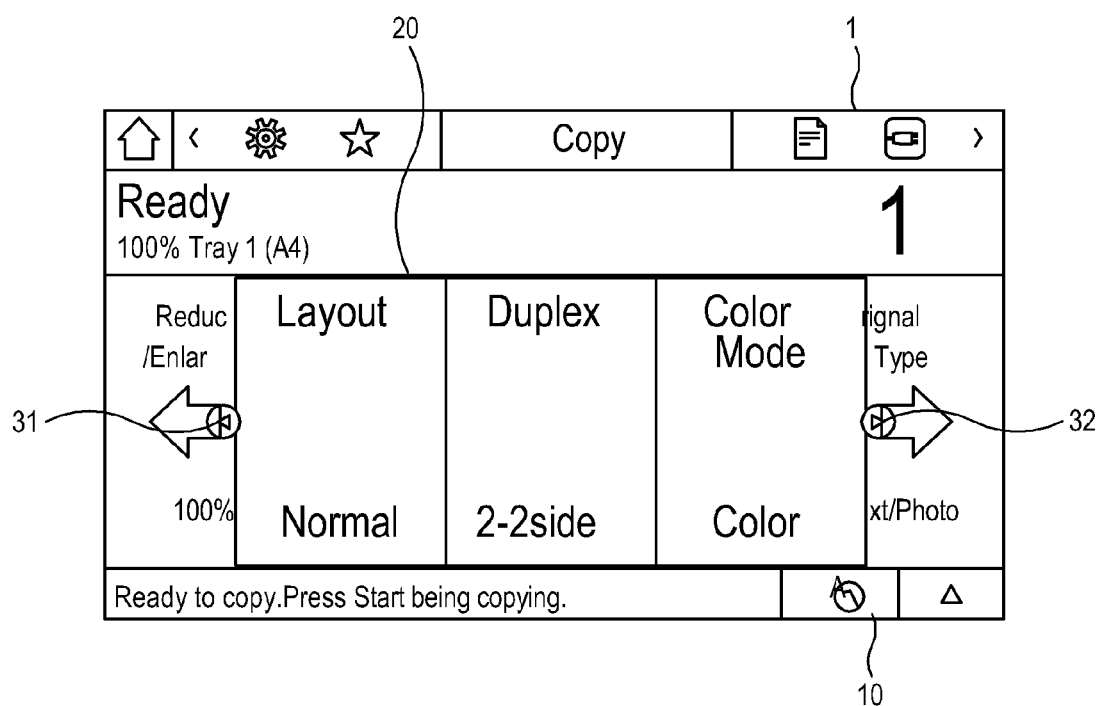
FIG. 11 illustrates a touch screen according to another exemplary embodiment of the present general inventive concept.

FIG. 11 illustrates a touch screen 1 according to another exemplary embodiment of the present general inventive concept.

If a user touches the target zooming function from the touch screen 1, the display unit 120 may enlarge, i.e., zoom and display at least one of the plurality of menu lists.

The target area 20 which includes the plurality of menus may be displayed to be moved left and right as shown in FIG. 11.

That is, the touch screen 1 may include a plurality of navigation buttons 33 and 34 to move the enlarged target area 20 left and right.

A user may touch one of the plurality of navigation buttons 33 and 34 to move the enlarged target area 20 left and right. The movement of the target area 20 includes an expansion to further include a left or right menu and a reduction to remove the left or right menu from the target area 20.

Even if the target area 20 moves left and right as in FIG. 11, the target area 20 may expand to include the entire menu displaying area 2*a*, and all the menus including the menu which is not displayed in the menu displaying area 2*a* may be included in the target area 20 through the navigation buttons 33 and 34.

The touch screen 1 in FIG. 11 may apply to movement, expansion and reduction of the target area 20 according to exemplary embodiments in FIGS. 3A to 10B.

Accordingly, the image forming apparatus 100 according to the present general inventive concept may selectively enlarge and display at least one of the plurality of menu lists, easily move, expand and reduce the target area through the navigation button to enable a user to easily select and confirm the menu from the limited touch screen.

The image forming apparatus 100 according to the present general inventive concept may enlarge and display the menu list through the navigation button while maintaining the touch screen like the initial screen to thereby minimize unnecessary change of screens.

The present general inventive concept may apply to various electronic devices such as mobile phone, PDA, MP3 player, digital camera, digital camcorder, laptop computer, monitor, TV as well as the image forming apparatus 100.

Hereinafter, an enlargement display process of the target area 20 of the image forming apparatus 100 having the foregoing configuration will be described with reference to FIG. 12.

Figure 12:
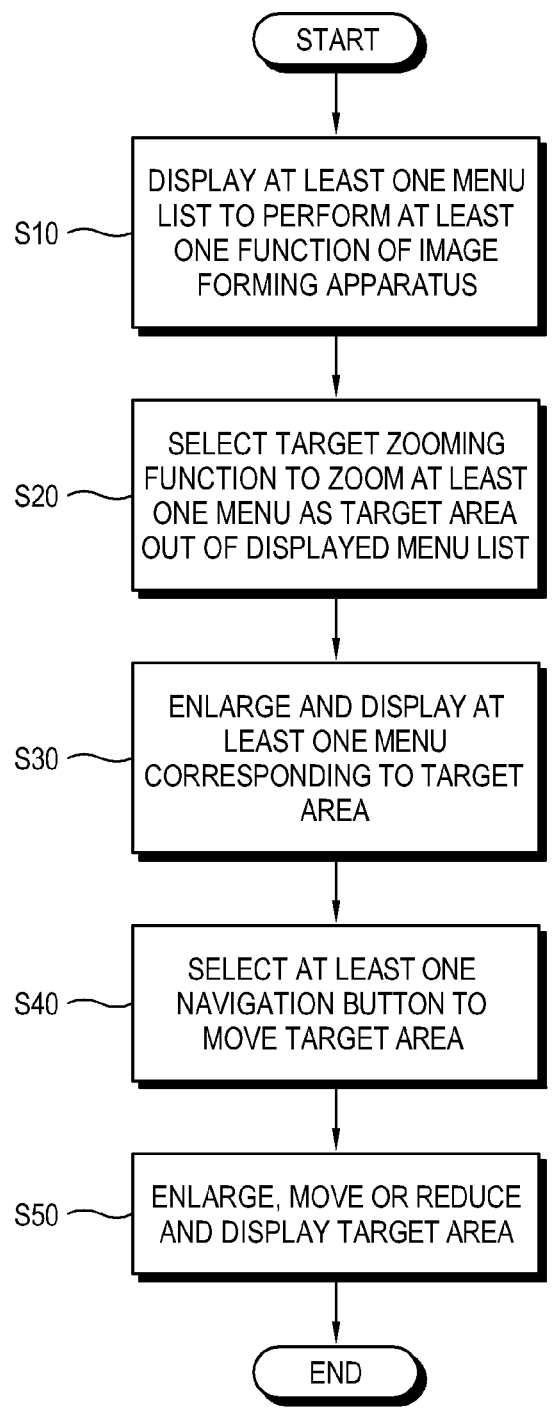
FIG. 12 is a flowchart of an enlargement display method of a target area of the image forming apparatus according to an exemplary embodiment of the present general inventive concept.

FIG. 12 is a flowchart of the enlargement display process of the target area 20 of the image forming apparatus 100 according to the present general inventive concept.

As shown therein, the display unit 120 may display at least one menu list as the touch screen 1 to perform at least one function of the image forming apparatus 100 (S10).

A user may select the target zooming function to zoom at least one menu as the target area to perform the predetermined function of the image forming apparatus 100 corresponding to the touch screen 1 (S20). A user may select the button 10 corresponding to the target zooming function as in FIGS. 7A and 7B or select the voluntary menu area 40 as in FIGS. 8A and 8B to enable the target zooming function.

The controller 160 controls the display unit 120 to enlarge and display at least of the plurality of menu lists corresponding to the target area 20 according to the target zooming function selected at operation S20 (S30). The controller 160 may control the display unit 120 to enlarge and display the top menu as the target area 20 as in FIG. 7B or enlarge and display the target area 20 including the selected menu as in FIG. 8B.

A user may select one of the navigation buttons 31 and 32 to move the target area 20 from the touch screen 1 displayed at operation S30 (S40).

The controller 160 may control the display unit 120 to enlarge, move or reduce and display the target area 20 according to the selection at operation S40 (S50).

The controller 160 may control the display unit 120 to enlarge and display the target area 20 including at least two of the plurality of menus as in FIGS. 3B and 3C or reduce and display the target area 20 including only the bottom or top menu as in FIGS. 6A and 6B.

The controller 160 may control the display unit 120 to move and display the target area 20 by predetermined number of menus (e.g., two menus).

At operations S40 and S50, the image forming apparatus 100 according to the present general inventive concept may enlarge or reduce the target area 20 according to a user's dragging motion as illustrated in FIGS. 9A to 9C.

Figure 13A:
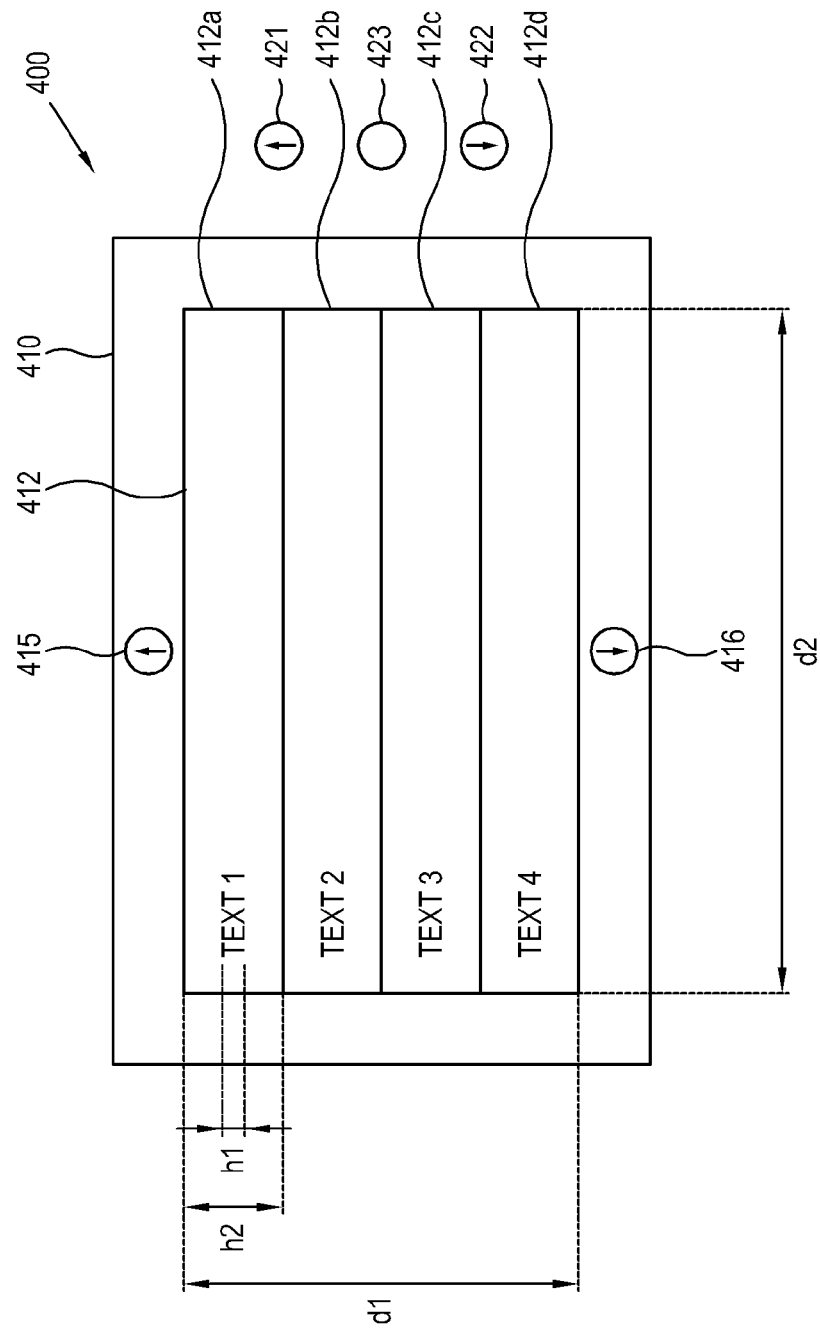

FIG. 13A illustrates an operation panel 400 including a display or touch screen 410 to display a menu list 412 including a plurality of menus 412*a*, 412*b*, 412*c*, and 412*d*. When the enlargement or zoom mode is not selected, the menu list 412 may have a height d1 and a width d2. The text of the respective menus may have a height h1, and the menus may each have a height h2.

The operation panel 400 may include physical inputs separate from the display 410, such as an up button 421, a down button 422, and a select button 423. Alternatively, the operation panel 400 may include an up icon 415 and a down icon 416 on the display 410, and the display may be a touch-screen display.

FIGS. 13B-13F illustrate example target area 413 configurations according to embodiments of the present general inventive concept. As illustrated in FIG. 13B, when the zoom function is enabled, be selecting a button, icon, double-tapping a touch screen, or by any other method, one of the menus 412*b* may increase in size. In FIG. 13*b*, the menu 412*b* increases in both a height dimension and a width dimension. Specifically, the height h4 of the menu increases from the original height h2. If the height d1 of the menu list remains the same, then the height h5*a*, h5*c*, or h5*d* of at least one of the non-target menus 412*a*, 412*c*, or 412*d* must decrease. The heights h5*a* and h5*c* of only the adjacent menus 412*a* and 412*c* may decrease, or the heights 45*a*, h5*c*, and h5*d* of all of the non-target menus 412*a*, 412*c*, and 412*d* may decrease.

Even when the height h5*a*, h5*b*, or h5*c* of one or more of the non-target menus 412*a*, 412*c*, or 412*d* decreases, the height h1 of the text of each of the non-target menus 412*a*, 412*c*, or 412*d* may remain the same size. This may allow a user to read even non-targeted menus.

As illustrated in FIG. 13C, when one menu 412*b* is in the target area 413, the heights h2 of the non-target menus 412*a*, 412*c*, and 412*d* may remain the same. In such a case, the menu list height d4 must increase to accommodate the increase in height h4 of the target area 413.

As illustrated in FIG. 13D, if the target menu 412*b* increases in height and the adjacent menus 412*a* and 412*c* decrease in height, the target menu 412*b* may have a transparent or translucent quality, as illustrated by the dashed lines in FIG. 13D, to display portions of the menu list 412 that are behind the target area 413.

FIG. 13E illustrates a target area 413 having a same width d2 as the non-target menus 412*a*, 412*c*, and 412*d*. Similar to FIG. 13B, the heights h5*a*, h5*c*, and h5*c* of the non-target menus 412*a*, 412*c*, and 412*d* may be reduced so that the menu list 412 maintains its original height d1. On the other hand, as illustrated in FIG. 13F, if the heights of the non-target menus 412*a*, 412*c*, and 412*d* maintain their original heights h2, then the height d4 of the menu list 412 is increased to accommodate the increase in height of the targeted menu 412*b*.

Figure 14:
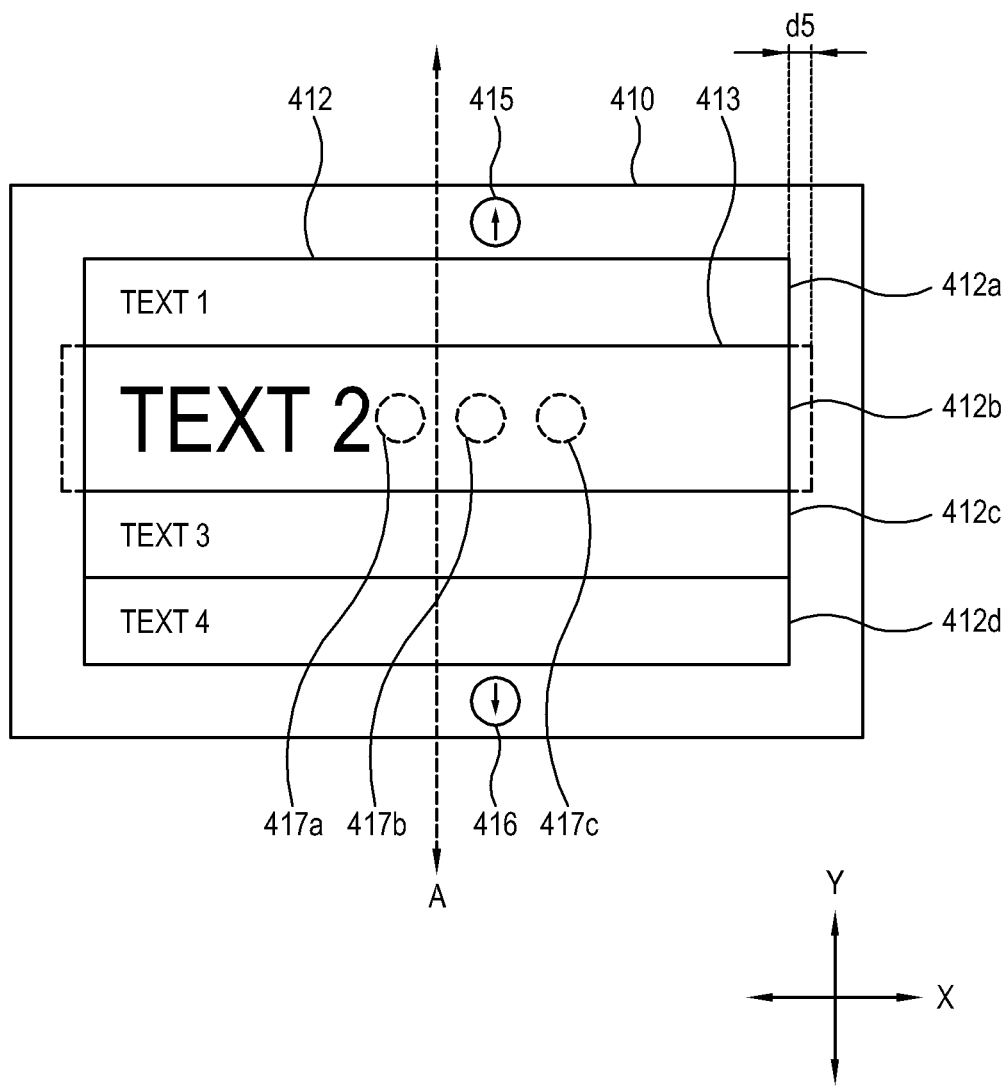
FIG. 14 illustrates a configuration of a target panel according to an embodiment of the present general inventive concept.

As illustrated in FIG. 14, when a target area 413 is selected, the targeted menu 412*b* may increase in size in a height dimension and a width dimension. The increase in the width dimension may be centered on an axis A, which is a movement axis of the menu list 412, or a direction in which the target area 413 may move from one menu to the next menu on the menu list 412. In other words, if the targeted menu 412*b* increases in width on one end by a distance d5, the targeted menu 412b may increase by a same width at the end on the opposite side of the axis A.

In addition, even when the targeted menu 412b increases in height or width, the ends of the targeted menu 412b may not extend past an end of the display 410. In other words, if a predetermined amount of data, such as text or symbols, is located within the menu 412b when the menu 412b is in a non-enlarged or non-targeted state, then the same text may be located within the menu 412b on the display 410 after the menu 412b is enlarged.

In addition, when the display is a touch-screen and a user touches any portion of the menu 412b to select the menu as a target area 413, the entire menu 412b is enlarged, regardless of the location on the menu 412b at which the user touches the menu 412b. For example, a user may touch a point 417a on a left side of the menu 412b, a portion 417b towards a center of the menu 412b, or a point 417c towards a right side of the menu 412b in the horizontal direction x, and the entire menu 412b will be enlarged in each case, and not just a portion of the menu 412b adjacent to the location where the user touched.

Similarly, a user may touch any portion of the menu 412b in the horizontal direction x to move the target area 413 up or down to an adjacent menu 412a or 412c, respectively, or to increase a size of the target area 413 to include a second menu 412a or 412c, respectively.

Figure 15A:
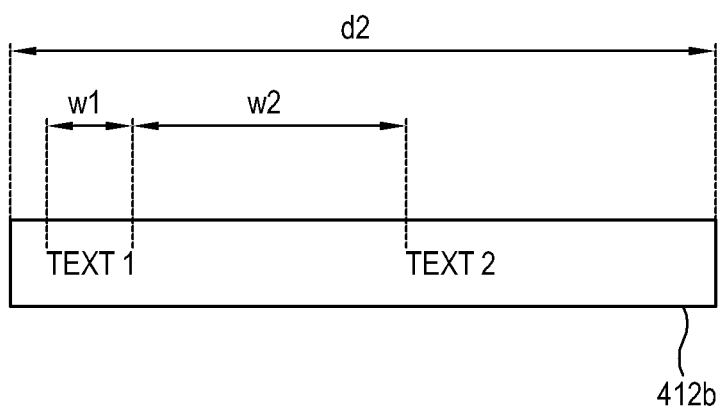
FIGS. 15A-15C illustrate configurations of text of a target panel according to embodiments of the present general inventive concept.
Figure 15B:
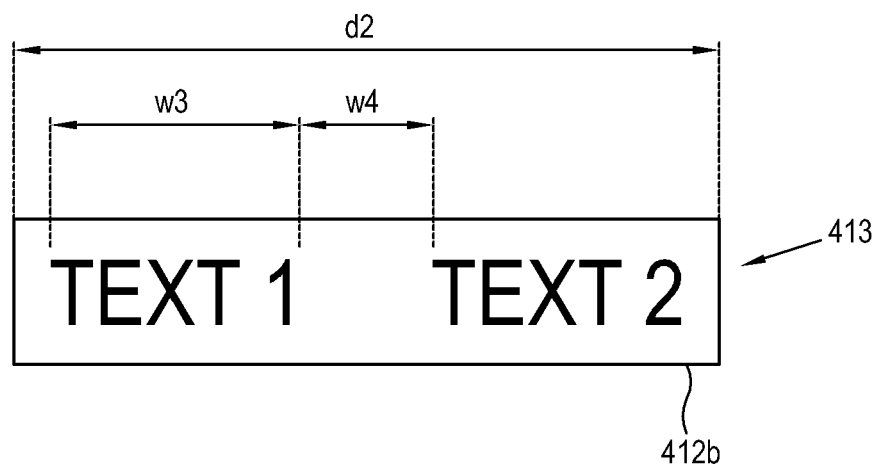
Figure 15C:
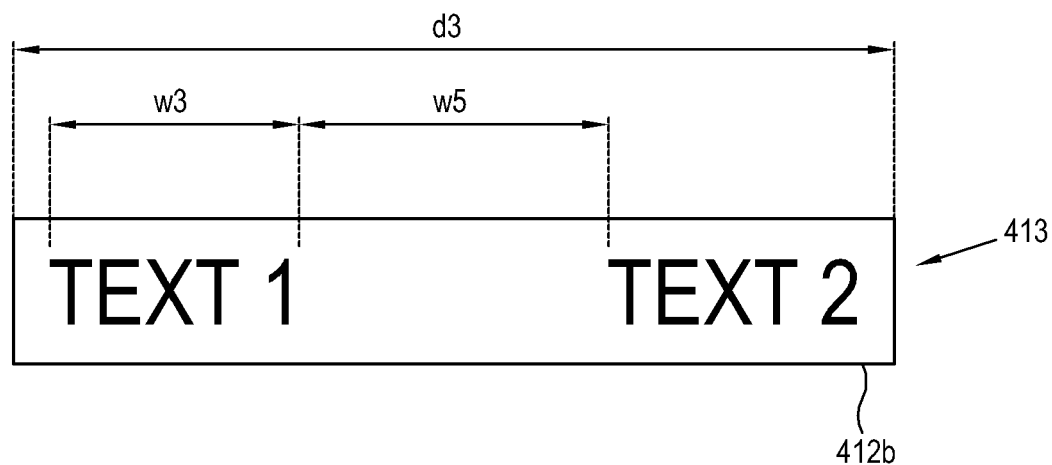

FIGS. 15A-15C illustrate adjusting a size of texts or objects in a targeted menu, such as 412b.

FIG. 15A illustrates a non-targeted menu 412b similar to that illustrated in FIG. 13A. The menu 412b has a width d2, a first visual element, such as text, having a width w1, a second visual element, such as text that is located a certain distance w2 from the first visual element. When the menu 412b is selected as a target area 413, the visual elements are enlarged, and the first visual element may have a width w3 that is greater than the width w1. If the menu 412b maintains a same width d2, then a distance w4 between the first visual element and the second visual element may decrease. In some situations, this may result in visual elements being located closer to one another than is visually appealing, or it may result in difficulty to understand the visual elements.

Consequently, one or more visual elements may be omitted from the targeted menu 412b, or, as illustrated in FIG. 15C, a width d3 of the menu 412b may be increased to increase the distance w5 between the two visual elements.

As above, the image forming apparatus 100 and the enlargement display method of the target area thereof according to the present general inventive concept enlarges and displays the necessary menu as the target area and easily moves the target area through the navigation button to thereby improve user's convenience.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An enlargement display method of a target area of an image forming apparatus which comprises a touch screen, the method comprising:
    selecting a target zooming function to zoom at least one menu encompassed by the target area among a plurality of menus in a menu list displayed on the touch screen as a target screen to perform at least one function of the image forming apparatus;
    enlarging and displaying at least one menu and the target area according to the selection while maintaining display of the plurality of menus, and when the enlarging of the at least one menu and the target area is greater than or equal to 25%, displaying the enlarged at least one menu and the target area in a transparent or semi-transparent manner;
    selecting at least one navigation button of a plurality of navigation buttons to encompass the target area; and
    moving the enlarged target area with the selected navigation button to further encompass another additional menu such that the additional menu is enlarged.

2. The method according to claim 1, further comprising displaying at least one menu list to perform at least one of the functions of the image forming apparatus.

3. The method according to claim 2, wherein the moving and displaying the target area comprises expanding the target area to comprise at least two of a plurality of menus if the menu list comprises the plurality of menus.

4. The method according to claim 3, wherein the moving and displaying the target area comprises moving and displaying the target area by a preset number of menus.

5. The method according to claim 3, wherein the moving and displaying the target area further comprises reducing the target area.

6. The method according to claim 5, wherein the moving and displaying the target area comprises expanding or reducing the target area corresponding to a dragging motion of a user.

7. The method according to claim 2, wherein the moving and displaying the target area comprises moving the target area to comprise a top menu if it is selected to move down the target area comprising a bottom menu, and moving the target area to comprise a bottom menu if it is selected to move up the target area comprising a top menu.

8. The method according to claim 1, wherein the navigation button is provided to move the target area up and down or left and right.

9. The method according to claim 1, wherein the selecting the target zooming function comprises selecting a button corresponding to the target zooming function or touching and selecting a voluntary menu area.

10. The method according to claim 1, wherein the moving and displaying the target area comprises applying the target area to an entire menu list displayed on the touch screen, and moving the target area comprising the entire area to a menu list which is not displayed on the touch screen.

11. An image forming apparatus, comprising:
    a display unit which displays thereon at least one menu list encompassed by a target area among a plurality of menus to perform at least one of a plurality of functions of the image forming apparatus;
    a user input unit which comprises a touch screen displayed on the display unit and at least one navigation button of a plurality of navigation buttons to encompass a menu on the at least one menu list and the target area and to move a selected navigation button to further encompass at least another additional menu to provide an enlarged target area such that the additional menu is enlarged; and
    a controller which controls the display unit to enlarge and display at least one menu of the plurality of menus and the target area, and when the enlarging of the at least one menu of the plurality of menus and the target area is greater than or equal to 25%, displaying the enlarged at least one menu of the plurality of menus and the target area in a transparent or semi-transparent manner, while maintaining display of the plurality of menus if a target zooming function is selected through the user input unit to zoom at least one menu of the menu list as the target area, and to display the enlarged target area according to a user's selection.

12. The image forming apparatus according to claim 11, wherein the display unit enlarges and displays the target area to comprise at least three of the plurality of menus according to a selection of the navigation button if the menu list comprises the plurality of menus.

13. The image forming apparatus according to claim 12, wherein the display unit moves and displays the target area by a preset number of menus.

14. The image forming apparatus according to claim 12, wherein the display unit reduces and displays the target area.

15. The image forming apparatus according to claim 14, wherein the user input unit receives a command to expand or reduce the target area by a user's drag by touch.

16. The image forming apparatus according to claim 11, wherein the display unit moves and displays the target area to comprise a top menu if it is selected to move down the target area comprising a bottom menu and moves and displays the target area to comprise a bottom button if it is selected to move up the target area comprising a top menu.

17. The image forming apparatus according to claim 12, wherein the navigation button is provided to move the target area up and down or left and right.

18. The image forming apparatus according to claim 11, wherein the user input unit receives a command to select a button corresponding to the target zooming function or selecting the target zooming function by touching a voluntary menu area.

19. The image forming apparatus according to claim 11, wherein the display unit applies the target area to the entire menu list displayed on the touch screen, and moves the target area applied to the entire area to a menu list which is not displayed on the touch screen.

20. A method of displaying a menu on a display device, comprising:

displaying a menu list encompassed by a target area among a plurality of menus such that visual elements of the plurality of menus have a first size;

enlarging and displaying at least a first one of the plurality of menus in the target area such that visual elements of the at least one enlarged menu have a second size larger than the first size and such that the visual elements of the rest of the plurality of menus have the first size, and when the enlarging of at least the first one of the plurality of menus in the target area is greater than or equal to 25%, displaying the enlarged at least first one of the plurality of menus in the target area in a transparent or semi-transparent manner; and enlarging and displaying, in addition to the at least first one, at least a second one of the plurality of menus located in a first direction with respect to the first menu in response to a user input indicating the first direction to further encompass at least the second one of the plurality of menus such that the at least second one of the plurality of menus is enlarged while maintaining display of the plurality of menus, and when the enlarging of at least the second one of the plurality of menus located in the first direction with respect to the first menu is greater than or equal to 25%, displaying the enlarged at least second one of the plurality of menus in the target area in a transparent or semi-transparent manner.

21. The method according to claim 20, wherein enlarging the second menu includes enlarging both the first menu and the second menu simultaneously.

22. The method according to claim 21, wherein the second menu is enlarged in response to a user input at an edge of the first menu corresponding to the first direction.

23. The method according to claim 20, wherein enlarging the second menu includes reducing a size of the first menu such that the visual elements of the first menu have the first size.

24. The method according to claim 23, wherein the entire first menu is enlarged when a point on the first menu is selected.

* * * * *